(12) United States Patent
Sun et al.

(10) Patent No.: US 11,452,104 B2
(45) Date of Patent: Sep. 20, 2022

(54) FREQUENCY SPECTRUM MANAGEMENT APPARATUS AND METHOD, FREQUENCY SPECTRUM COORDINATION APPARATUS AND METHOD, AND ELECTRONIC DEVICE

(71) Applicant: Sony Corporation, Tokyo (JP)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 183 days.

(21) Appl. No.: 16/611,850

(22) PCT Filed: Jun. 6, 2018

(86) PCT No.: PCT/CN2018/090075
§ 371 (c)(1),
(2) Date: Nov. 7, 2019

(87) PCT Pub. No.: WO2018/223983
PCT Pub. Date: Dec. 13, 2018

(65) Prior Publication Data
US 2021/0153184 A1    May 20, 2021

(30) Foreign Application Priority Data

Jun. 9, 2017 (CN) .......................... 201710433701.8

(51) Int. Cl.
*H04W 72/04* (2009.01)
*H04W 72/08* (2009.01)

(52) U.S. Cl.
CPC ....... *H04W 72/048* (2013.01); *H04W 72/082* (2013.01)

(58) Field of Classification Search
CPC .......................... H04W 72/048; H04W 72/082
See application file for complete search history.

(56) References Cited

U.S. PATENT DOCUMENTS

2013/0035108 A1* 2/2013 Joslyn .................. H04W 24/08
                                                                    455/454
2016/0262024 A1* 9/2016 Freda ................ H04W 72/0453
2017/0041802 A1   2/2017 Sun

FOREIGN PATENT DOCUMENTS

CN        105101216 A       11/2015
CN        105101216 A        1/2017
(Continued)

OTHER PUBLICATIONS

International Search Report and Written Opinion dated Jul. 30, 2018 for PCT/CN2018/090075 filed on Jun. 6, 2018, 9 pages including English Translation of the International Search Report.

*Primary Examiner* — Ayanah S George
(74) *Attorney, Agent, or Firm* — Xsensus LLP

(57) ABSTRACT

The frequency spectrum management apparatus includes a processing circuit, and the processing circuit is configured to: determine, in response to a frequency spectrum resource request from one or more secondary systems, available frequency spectrum information about each secondary system; determine, according to frequency spectrum management information from the one or more secondary systems, a managed secondary system managed by a frequency spectrum coordination apparatus and a non-managed secondary system not managed by the frequency spectrum coordination apparatus; determine, based on system information about the managed secondary system, a non-managed secondary system, the interference thereof with respect to the managed secondary system exceeding a predetermined threshold value, to be an interference secondary system; and acquire system information, about the interference secondary system, to be sent to the frequency spectrum coordination apparatus, so that the frequency spectrum coordination apparatus coordinates the frequency spectrum usage of the managed secondary system.

14 Claims, 13 Drawing Sheets

(56) References Cited

FOREIGN PATENT DOCUMENTS

WO        2011/035328 A1     3/2011
WO    WO-2015169063 A1 * 11/2015   ............ H04W 16/10

* cited by examiner

FREQUENCY SPECTRUM MANAGEMENT APPARATUS AND METHOD, FREQUENCY SPECTRUM COORDINATION APPARATUS AND METHOD, AND ELECTRONIC DEVICE

CROSS-REFERENCE TO RELATED APPLICATIONS

The present application is based on PCT filing PCT/CN2018/090075, filed Jun. 6, 2018, which claims priority to CN 201710433701.8, filed Jun. 9, 2017, the entire contents of each are incorporated herein by reference.

FIELD

The present disclosure generally relates to the technical field of wireless communications, and in particular to a spectrum management device and method, a spectrum coordination device and method, an electronic device and a method therefor, and a wireless communication system, with which spectrum resource use is coordinated.

BACKGROUND

With the development of wireless communication systems, users are having a higher demand on services of a high quality, a high speed and new services, which requires the wireless communication operators and device providers to improve the systems to satisfy the users' needs. It requires a lot of spectrum resources (the amount of which may be indicated by parameters such as a time, a frequency, a bandwidth and an allowable maximum transmission power) to support the new services and satisfy the requirement for a high speed communication. However, the spectrum resources, which are limited, have been allocated to fixed operators and services, and new available spectrum is rare or expensive. In this case, a concept of dynamic spectrum use is proposed, that is, dynamically using spectrum resources which have been allocated to certain services but are not sufficiently used. For example, spectrums of some channels having no broadcast program or spectrums of adjacent channels in digital television broadcast spectrums are dynamically used to perform wireless mobile communication, without interfering with receiving of television signals.

In this application example, since the television broadcast spectrum is originally allocated for use by a television broadcast system, the television broadcast system is referred to as a primary system, a television is referred to as a primary user, a mobile communication system that use the television broadcast spectrum without interfering with receiving of television signals is referred to as a secondary system, and a receiver in the mobile communication system is referred to as a secondary user. Here, the primary system may refer to a system having the authority to use a spectrum, for example, the television broadcast system; and the secondary system is a system which has no authority to use the spectrum and appropriately uses the spectrum owned by the primary system only when the primary system does not use the spectrum, for example, the mobile communication system. In addition, the primary system and the secondary system may be systems both having the authority to use the spectrum, but they may have different priorities of spectrum use, wherein the primary system may have a higher priority of spectrum use than that of the secondary system. For example, when the operator deploys a new base station to provide a new service, an existing base station and services thereof have the priority of spectrum use. In this case, the existing base station can be deemed as a primary system and the new base station can be deemed as a secondary system. The primary system includes a primary base station and a primary user. The secondary system includes a secondary base station and a secondary user.

For such a communication mode in which the primary system and the secondary system coexist, it is required that an application of the secondary system does not impact an application of the primary system, or an influence of spectrum use of the secondary system can be controlled to be within a tolerance range of the primary system. When there are multiple secondary systems, aggregated interference by these secondary systems cannot exceed the interference tolerance range of the primary system.

SUMMARY

The present disclosure is briefly summarized below, so as to provide basic understanding of some aspects of the present disclosure. However, it should be understood that this summary is not an exhaustive overview of the present disclosure. It is neither intended to identify key or critical parts of the present disclosure, nor intended to delineate the scope of the present disclosure. It merely functions to present some concepts of the present disclosure in a simplified form to be used as a prelude to a more detailed description stated later.

An object of at least one aspect of the present disclosure is to provide a spectrum management device and method, a spectrum coordination device and method, an electronic device, and a wireless communication system, which enable a spectrum coordination device to obtain information related to interference from a secondary system that is not managed by the spectrum coordination device, so as to improve the effect of spectrum coordination.

According to an aspect of the present disclosure, a spectrum management device comprising processing circuitry is provided. The processing circuitry is configured to: determine, in response to a spectrum resource request from each of one or more secondary systems, available spectrum information of each of the one or more secondary systems; determine, according to spectrum management information from each of the one or more secondary systems, a managed secondary system which is managed by a spectrum coordination device and an unmanaged secondary system which is not managed by the spectrum coordination device among the one or more secondary systems; determine, based on system information of the managed secondary system, a secondary system interference from which on the managed secondary system exceeds a predetermined threshold among the unmanaged secondary system, as an interfering secondary system; and acquire system information of the interfering secondary system for the spectrum coordination device to coordinate spectrum use of the managed secondary system based on the available spectrum information.

According to another aspect of the present disclosure, a spectrum coordination device including processing circuitry is further provided. The processing circuitry is configured to coordinate, in response to a spectrum coordination request from a managed secondary system which is managed by a spectrum coordination device among one or more secondary systems, spectrum use of the managed secondary system according to system information of an interfering secondary system among the one or more secondary systems. The interfering secondary system is a secondary system, interference from which on the managed secondary system exceeds a predetermined threshold, among an unmanaged secondary system which is not managed by the spectrum coordination device, the unmanaged secondary system being determined by a spectrum management device according to spectrum management information from one or more secondary systems, and the system information of the interfering secondary system is acquired by the spectrum management device.

According to another aspect of the present disclosure, an electronic device including processing circuitry is further provided. The processing circuitry is configured to generate a spectrum resource request and spectrum management information to be sent to a spectrum management device, for the spectrum management device to determine available spectrum information of a secondary system in which the electronic device locates and whether the secondary system is managed by a spectrum coordination device.

According to another aspect of the present disclosure, a wireless communication system is further provided, which includes a spectrum management device, a spectrum coordination device and one or more secondary systems. The one or more secondary systems are configured to send a spectrum resource request and spectrum management information to the spectrum management device. The spectrum management device is configured to: determine, in response to the spectrum resource request, available spectrum information of the one or more secondary systems; determine, according the spectrum management information, a managed secondary system which is managed by the spectrum coordination device and an unmanaged secondary system which is not managed by the spectrum coordination device among the one or more secondary systems; determine, based on system information of the managed secondary system, a secondary system interference from which on the managed secondary system exceeds a predetermined threshold among the unmanaged secondary system, as an interfering secondary system; and acquire system information of the interfering secondary system to be sent to the spectrum coordination device. The spectrum coordination device is configured to coordinate, in response to a spectrum coordination request from the managed secondary system, spectrum use of the managed secondary system according to the system information of the interfering secondary system and the available spectrum information.

According to another aspect of the present disclosure, a spectrum management method is further provided, which includes: determining, in response to a spectrum resource request from each of one or more secondary systems, available spectrum information of each of the one or more secondary systems; determining, according to spectrum management information from each of the one or more secondary systems, a managed secondary system which is managed by a spectrum coordination device and an unmanaged secondary system which is not managed by the spectrum coordination device among the one or more secondary systems; determining, based on system information of the managed secondary system, a secondary system interference from which on the managed secondary system exceeds a predetermined threshold among the unmanaged secondary system, as an interfering secondary system; and acquiring system information of the interfering secondary system for the spectrum coordination device to coordinate spectrum use of the managed secondary system based on the available spectrum information.

According to another aspect of the present disclosure, a spectrum coordination method is further provided, which includes coordinating, in response to a spectrum coordination request from a managed secondary system which is managed by a spectrum coordination device among one or more secondary systems, spectrum use of the managed secondary system according to system information of an interfering secondary system among the one or more secondary systems. The interfering secondary system is a secondary system, interference from which on the managed secondary system exceeds a predetermined threshold, among an unmanaged secondary system which is not managed by the spectrum coordination device, the unmanaged secondary system being determined by a spectrum management device according to spectrum management information from one or more secondary systems, and the system information of the interfering secondary system is acquired by the spectrum management device.

According to another aspect of the present disclosure, a method in an electronic device is further provided, which includes generating a spectrum resource request and spectrum management information to be sent to a spectrum management device, for the spectrum management device to determine available spectrum information of a secondary system in which the electronic device locates and whether the secondary system is managed by a spectrum coordination device.

According to other aspects of the present disclosure, it is also provided a computer program code and a computer program product for implementing the above method(s) according to the present disclosure, as well as a computer readable storage medium on which the computer program code for implementing the above method(s) according to the present disclosure is recorded.

According to an embodiment of the present disclosure, the spectrum coordination device is allowed to obtain information related to interference of a secondary system that is not managed by the spectrum coordination device, and thus the effect of spectrum coordination can be greatly improved as compared with the conventional technology, thereby further improving the utilization efficiency of spectrum resources.

Other aspects of the embodiments of the present disclosure are described in the following part of the specification, in which the detailed description is used for fully disclosing, without limiting, preferred embodiments of the present disclosure.

BRIEF DESCRIPTION OF THE DRAWINGS

The present disclosure can be understood better with reference to the detail description made in conjunction with the drawings in the following. The same or like element is indicated by the same or like reference numeral throughout all the drawings. The drawings, together with the following detailed description, are included in the specification and form a part of the specification, and they serve to further illustrate the preferred embodiments of the disclosure and to explain the principle and advantages of the present disclosure by way of example. In the drawings.

DETAILED DESCRIPTION OF EMBODIMENTS

Figure 1:
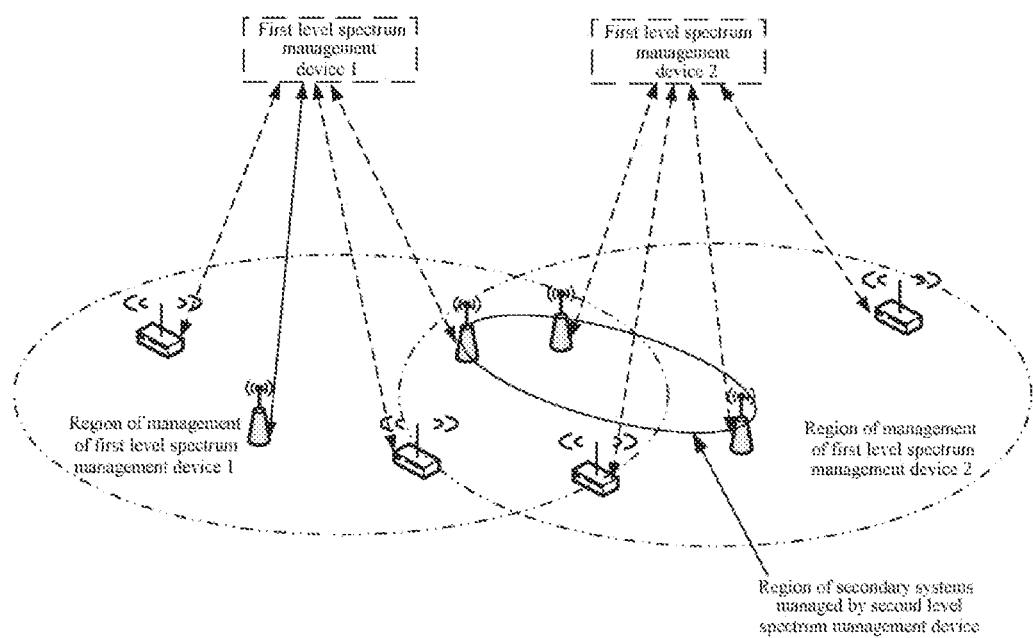
FIG. 1 is a schematic diagram showing an example of an application scenario according to an embodiment of the present disclosure.

Exemplary embodiments of the present disclosure are described below in conjunction with the drawings. For the sake of clarity and conciseness, not all the features of practical embodiments are described in the specification. However, it should be appreciated that numerous embodiment-specific decisions shall be made during developing any of such practical embodiments so as to achieve the developer's specific goals, for example, to comply with system- and business-related constraining conditions which may vary from one embodiment to another. Furthermore, it should also be understood that although the development work may be very complicated and time-consuming, for those skilled in the art benefiting from the present disclosure, such development work is only a routine task.

It is further to be noted here that, to avoid obscuring the present disclosure due to unnecessary details, only the device structure and/or processing step closely related to the solution of the present disclosure are shown in the drawings, and other details less related to the present disclosure are omitted.

In the following, preferred embodiments of the present disclosure are described in detail in conjunction with FIGS. 1 to 14. Hereinafter, description is made in the following order.

1. Example of an application scenario according to an embodiment of the present disclosure 2. Device embodiments according to the present disclosure
   2-1. Spectrum management device according to an embodiment of the present disclosure
   2-2. Spectrum coordination device according to an embodiment of the present disclosure
   2-3. Electronic device in a secondary system according to an embodiment of the present disclosure
   2-4. Wireless communication system according to an embodiment of the present disclosure 3. Signaling interaction processes according to an embodiment of the present disclosure 4. Method embodiments according to the present disclosure
   4-1. Spectrum management method according to an embodiment of the present disclosure
   4-2. Spectrum coordination method according to an embodiment of the present disclosure
   4-3. Method in an electronic device according to an embodiment of the present disclosure 5. Computing device for implementing the device(s) and the method(s) according to the embodiments of the present disclosure 6. Application examples of the technology according to the present disclosure
   6-1. Application examples of the spectrum management device and the spectrum coordination device
   6-2. Application examples for the secondary system
      6-2-1. Application example of a base station
      6-2-2. Application example of a user equipment 1. Example of an Application Scenario According to an Embodiment of the Present Disclosure First, referring to FIG. 1, an example of an application scenario according to an embodiment of the present disclosure is described. FIG. 1 is a schematic diagram showing an example of an application scenario according to an embodiment of the present disclosure.

As shown in FIG. 1, there are multiple regions, wherein each region has its own first level spectrum management device. The first level spectrum management devices determine available spectrum resources for the respective secondary systems according to interference on a primary system. These spectrum management devices may be each, for example, a function module for spectrum allocation that is provided by a Geographic Location Database (GLDB) operator authorized according to national regulations. After the secondary system obtains the available spectrum resource, a second level spectrum management device adjusts spectrum use of the secondary system within a range of the available spectrum resource. This spectrum management device may be, for example, a different operator or network provider, or a network management organization of a certain office area, a residential area, a university campus, or the like.

As shown in FIG. 1, all the secondary systems should access the first level spectrum management device to obtain available spectrum resources. Then, some of the secondary systems that are managed by the second level spectrum management device send their available spectrum resource information to the second level spectrum management device, for the second level spectrum management device to coordinate the spectrum use of these secondary systems. Around the managed secondary systems, there may be secondary systems that are not managed by the second level spectrum management device, and such secondary systems may causes interference on communications of the managed secondary systems. However, according to the conventional technology, the second level spectrum management device cannot obtain, directly from interfering secondary systems that are not managed by the second level spectrum management device, information related to such interfering secondary systems, thereby greatly affecting the effect of the spectrum use coordination and the resource utilization efficiency.

The technology according to the embodiment of the present disclosure is provided to solve the above problem. Furthermore, it should be noted that, in the following, for convenience of description, the first level spectrum management device may be referred to as a "spectrum management device", which is generally configured to allocate available spectrum resources to the secondary systems without affecting the performance of the primary system. The second level spectrum management device may be referred to as a "spectrum coordination device", and the spectrum coordination device is generally configured to coordinate and optimize the spectrum use of each secondary system which it manages within the range of available spectrum resources allocated by the spectrum management device, to improve the utilization efficiency of the spectrum resources.

2. Device Embodiments According to the Present Disclosure

2-1. Spectrum Management Device According to an Embodiment of the Present Disclosure FIG. 2 is a block diagram showing an example of a functional configuration of a spectrum management device according to an embodiment of the present disclosure.

Figure 2:
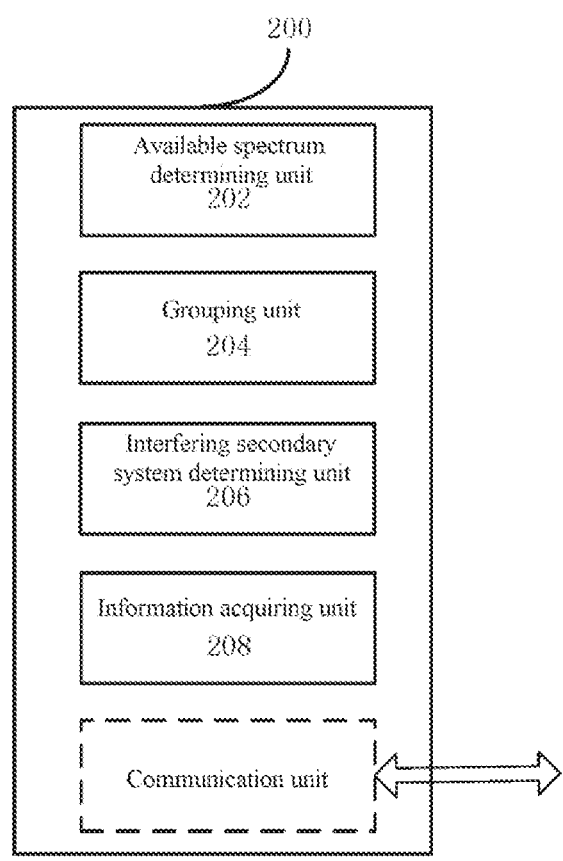
FIG. 2 is a block diagram showing an example of a functional configuration of a spectrum management device according to an embodiment of the present disclosure.

As shown in FIG. 2, a spectrum management device 200 according to the embodiment may include an available spectrum determining unit 202, a grouping unit 204, an interfering secondary system determining unit 206, and an information acquiring unit 208. In the following, an example of a configuration of each unit is described in detail.

The available spectrum determining unit 202 may be configured to determine, in response to a spectrum resource request from each of one or more secondary systems, available spectrum information of each of the one or more secondary systems.

As described above, the spectrum management device may be a function module for spectrum allocation that is provided by a Geographic Location Database (GLDB) operator authorized according to national regulations. Currently, a main way of protecting the primary system is to store coverage information of the primary system in a database (for example, a geographical location database (GLDB) or a cognitive engine database). For example, the database may also have a top limit of interference that the primary system can tolerate, a condition of the primary system using the spectrum resource, and the like stored therein. For a secondary system within the same region as the primary system, before using a spectrum of the primary system, it first needs to access the database, that is, to send a spectrum resource request to the spectrum management device 200, to submit state information such as location information, a spectrum emission mask, a transmission bandwidth, a carrier frequency and the like of the secondary system. Then, the available spectrum determining unit 202 of the spectrum management device 200 may calculate an amount of interference of the secondary system on the primary system according to the state information of the secondary system, and calculate a predicted available spectrum resource for the secondary system in the current state according to the calculated amount of interference of the secondary system on the primary system in the current state. The geographical location database is defined according to the conventional technology and the predicted spectrum resource is determined by the database according to the conventional technology, which is not described here.

The grouping unit 204 may be configured to determine, according to spectrum management information from each of the one or more secondary systems, a managed secondary system which is managed by the spectrum coordination device and an unmanaged secondary system which is not managed by the spectrum coordination device among the one or more secondary systems.

Specifically, when accessing the geographic location database provided in the spectrum management device 200 to obtain available spectrum resources, the one or more secondary systems need to submit their respective spectrum management information. The spectrum management information herein may include information related to a condition of the one or more secondary systems being managed by the spectrum coordination device.

It should be understood that there may be one or more spectrum coordination devices within a region managed by the spectrum management device 200, and one or more secondary systems within the region may be managed by different spectrum coordination devices or by the same spectrum coordination device, or there may be some secondary systems that are not managed by any of the spectrum coordination devices. Preferably, as an example, the spectrum management information from any one of the secondary systems may include an identifier (ID) of the spectrum coordination device that manages the secondary system, so that the grouping unit 204 may determine which secondary systems are managed by the same spectrum coordination device according to the received ID information of the spectrum coordination device. In addition, for a secondary system spectrum management information of which is not received, the spectrum management device 200 may determine that the secondary system is not managed by any of the spectrum coordination devices.

Thus, for any of the spectrum coordination devices, the grouping unit 204 of the spectrum management device 200 may determine a managed secondary system and an unmanaged secondary system for the spectrum coordination device. In other words, the secondary systems are logically grouped into multiple secondary system groups according to the spectrum coordination device to which each secondary system belongs. The so-called "managed secondary system" and "unmanaged secondary system" herein are defined according to a condition whether the secondary system is managed by a certain spectrum coordination device, and the terms do not refer to a managed secondary system or an unmanaged secondary system in an absolute sense.

Preferably, after determining the group to which each secondary system belongs, that is, after determining the managed secondary system and the unmanaged secondary system for the specific spectrum coordination device, the grouping unit 204 may further determine a range of the managed secondary system(s), that is, a range managed by the spectrum coordination device. As shown in FIG. 1, a range of managed secondary systems related to a certain spectrum coordination device is shown.

It should be noted that the above spectrum management information may be included in the spectrum resource request, or may be information that is independently sent after the spectrum resource request is sent, which is not limited in the disclosure.

In addition, it should be noted that the form of the spectrum management information described above (that is, the ID of the spectrum coordination device) is merely an example rather than a limitation, and those skilled in the art may appropriately set a specific content of the spectrum management information according to actual needs. For example, the spectrum management information may also include information such as a manner in which the secondary system is managed by the spectrum coordination device.

The interfering secondary system determining unit 206 may be configured to determine, based on system information of the managed secondary system, a secondary system interference from which on the managed secondary system(s) exceeds a predetermined threshold among the unmanaged secondary system(s), as an interfering secondary system.

Preferably, the system information of the managed secondary system may include geographic location information and receiver information of the managed secondary system, which may be sent to the spectrum management device 200, for example, when the secondary system accesses the geographic location database of the spectrum management device 200, in a manner of being included in the spectrum resource request. Thus, the interfering secondary system determining unit 206 of the spectrum management device 200 may determine an interfering secondary system for each managed secondary system according to the geographical location information and the receiver information of each managed secondary system.

Moreover, preferably, the interfering secondary system determining unit 206 may also determine the interfering secondary system according to, for example, information related to the range of the managed secondary system(s) as determined above. Specifically, for example, an interference radius may be determined according to the receiver information of the managed secondary system located at an edge of the range, and the unmanaged secondary system located within a range of the interference radius may be determined to be an interfering secondary system. It can be seen that since the secondary systems managed by the same spectrum coordination device are generally close to each other geographically, this method can greatly reduce the processing load and complexity compared with a method of separately determining the interfering secondary system(s) for each managed secondary system.

It should be noted that the manner in which the interfering secondary system is determined herein is merely an example rather than a limitation, and those skilled in the art may determine the unmanaged secondary system the interference from which on the managed secondary system exceeds a predetermined threshold in other suitable manners according to the principle of the present disclosure, and determine this managed secondary system as an interfering secondary system.

The information acquiring unit 208 may be configured to acquire system information of the interfering secondary system.

Specifically, after determining an interfering secondary system for a certain spectrum coordination device, as an example, the information acquiring unit 208 may acquire one or more of the geographic location information, the available spectrum information, and the spectrum use information of each of interfering secondary systems as system information of each of the interfering secondary systems.

Preferably, the available spectrum information may include one or more of a transmission power and an antenna angle, which may be acquired, for example, by the information acquiring unit 208 from the geographic location database. Moreover, preferably, the spectrum use information may include one or more of system activation probability and movement information, which may be acquired, for example, by the information acquiring unit 208 through query based on stored history information.

Alternatively, as another example, the information acquiring unit 208 may be configured to acquire system statistical information within a region in which the secondary system locates as system information of the interfering secondary system. Preferably, the system statistical information may include, for example, the number of interfering secondary systems, movement information (for example, an average moving speed), and the like within the region in which the interfering secondary system locates.

Alternatively, as another example, the information acquiring unit 208 may be configured to calculate, for each managed secondary system, aggregated interference from the interfering secondary system as the system information of the interfering secondary system, according to a transmission model of a region in which the interfering secondary system locates and a transmission antenna parameter (for example, an antenna height, a direction, a beam, and the like) of the interfering secondary system.

It should be noted that the manner of acquiring the system information of the interfering secondary system described above is merely an example rather than a limitation, and those skilled in the art may obtain appropriate information as the system information of the interfering secondary system in other manners according to the principle of the present disclosure in considering actual needs, as long as the information may facilitate the spectrum coordination device to coordinate and optimize the spectrum use of the managed secondary system.

The acquired system information of the interfering secondary system is to be sent to the spectrum coordination device, for the spectrum coordination device to coordinate the spectrum use of the managed secondary system based on the information related to interference and information related to the managed secondary system within the range of available spectrum resources determined by the spectrum management device 200.

System information of the interfering secondary system may be sent directly or indirectly to the spectrum coordination device. Specifically, if there is a communication interface that may perform direct communication between the spectrum management device 200 as a first level spectrum management device and the spectrum coordination device as a second level spectrum management device, the spectrum management device 200 may send the acquired system information of the interfering secondary system directly to the spectrum coordination device. In addition, if there is no communication interface that may perform direct communication between the spectrum management device 200 and the spectrum coordination device due to limitations such as information security, policies and regulations, the spectrum management device 200 may send the acquired system information of the interfering secondary system to the managed secondary system managed by the spectrum coordination device, for the managed secondary system to send the system information of the interfering secondary system to the spectrum coordination device while sending the spectrum coordination request to the spectrum coordination device.

It should be noted that when the system information of the interfering secondary system is relayed via the managed secondary system, the spectrum management device 200 may separately send the system information of the interfering secondary system for each managed secondary system to the corresponding managed secondary system, such that each managed secondary system is only responsible for sending interference information related to itself; alternatively, the spectrum management device 200 may send system information of all the interfering secondary systems to one or more of the managed secondary systems according to actual conditions, for the one or more managed secondary systems to perform information relaying, which is not limited in the disclosure.

It can be seen that, according to the embodiment of the present disclosure, compared with a solution in the conventional technology, each secondary system needs to send its spectrum management information to the spectrum management device, for the spectrum management device to determine, for each spectrum coordination device within its managed region, information related to an interfering secondary system that is not managed by the spectrum coordination device, such that the spectrum coordination device can perform spectrum coordination based on the information related to interference, thereby further improving the utilization efficiency of the spectrum resources.

It should be noted that the spectrum management device 200 herein may be implemented at a chip level, or may be implemented at a device level by including other peripheral components. For example, the spectrum management device 200 may further include a communication unit (which is optional and is shown in a dashed box), for performing data transmission and reception operations with an external device. For example, the communication unit may be configured to perform communication with one or more secondary systems, communication with the spectrum coordination device, communication with other spectrum management devices, and the like. In addition, it should be further noted that the specific implementation of the communication unit is not limited here, and it may include one or more communication interface(s) for realizing communication with different peripheral devices.

2-2. Spectrum Coordination Device According to an Embodiment of the Present Disclosure FIG. 3 is a block diagram showing an example of a functional configuration of a spectrum coordination device according to an embodiment of the present disclosure.

Figure 3:
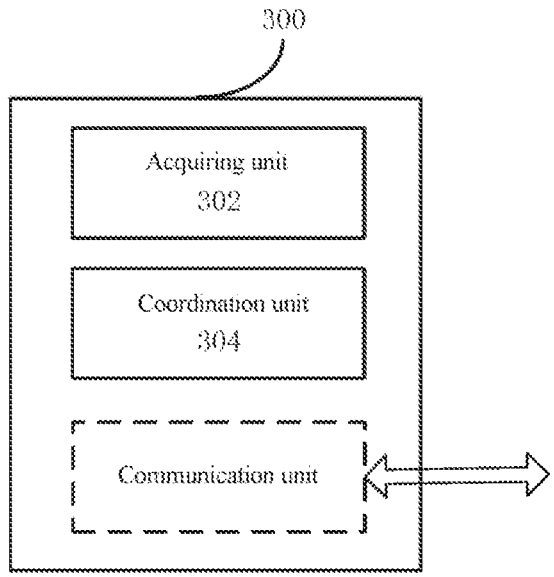
FIG. 3 is a block diagram showing an example of functional configuration of a spectrum coordination device according to an embodiment of the present disclosure.

Referring to FIG. 3, a spectrum coordination device 300 according to the embodiment may include an acquiring unit 302 and a coordination unit 304. An example of a configuration of each functional unit is described in detail below.

The acquiring unit 302 may be configured to acquire a spectrum coordination request from a managed secondary system which is managed by the spectrum coordination device 300 among one or more secondary systems, and system information of an interfering secondary system among the one or more secondary systems.

The spectrum coordination request may include available spectrum information of the managed secondary system, and the available spectrum information may be determined by the spectrum management device according to the spectrum resource request from each of the one or more secondary systems as described above. The interfering secondary system refers to a secondary system interference from which on the managed secondary system exceeds a predetermined threshold, among the unmanaged secondary systems that are not managed by the spectrum coordination device 300, and the interfering secondary system may be determined by the spectrum management device based on information related to the managed secondary system. The unmanaged secondary systems may be determined by the spectrum management device according to spectrum management information from each of the one or more secondary systems as described above. For a detailed description of the determining process and the information acquiring process, reference may be made to the above description of the embodiment of the spectrum management device, which is not described herein again.

The system information of the interfering secondary system may be acquired by the spectrum management device as described above, and may be sent from the spectrum management device directly to the spectrum coordination device 300, or be relayed via the managed secondary system(s) of the spectrum coordination device 300. For a detailed description of the information acquiring process and the sending manner, reference may be made to the above description of the embodiment of the spectrum management device, which is not described herein again.

The coordination unit 304 may be configured to coordinate, in response to a spectrum coordination request from the managed secondary system, spectrum use of the managed secondary system according to the system information of the interfering secondary system.

Specifically, as an example, the system information of the interfering secondary system may include information on interference direction, such that the coordination unit 304 may be further configured to coordinate, according to the information on interference direction, spectrum use of the managed secondary system in a manner of avoiding interference from being received by the managed secondary system.

As another example, the system information of the interfering secondary system may further include system statistical information within the region in which the secondary system locates, and the system statistical information may include the number of interfering secondary systems, movement information, and the like within the region. Thus, the coordination unit 304 may be further configured to model an interference condition within the region according to the system statistical information and adjust a transmission power of the managed secondary system according to the modeled interference condition. In this way, by modeling the interference condition according to the system statistical information within the region in which the secondary system locates, the spectrum coordination device 300 may acquire the information related to interference more accurately and comprehensively, thereby further optimizing the spectrum use.

It should be noted that the manner of how the coordination unit 304 of the spectrum coordination device 300 coordinates the spectrum use of the managed secondary system by using the received system information of the interfering secondary system is merely an example rather than a limitation, and those skilled in the art may coordinate spectrum use by appropriately using specific content included in the system information of the interfering secondary system according to the principle of the present disclosure in considering actual needs.

It can be seen that, compared with the conventional technology, the spectrum coordination device according to the embodiment of the present disclosure also considers information of the interfering secondary system that is not managed by it while performing spectrum coordination, thereby further improving the coordination effect, thus improving the utilization efficiency of spectrum resources.

It should be noted that, the embodiment of the spectrum coordination device 300 described here corresponds to the above embodiment of the spectrum management device, and therefore, for the content that is not described in detail here, one may refer to the description of the corresponding part above, and details are not described herein again.

It should be noted that the spectrum coordination device 300 herein may be implemented at a chip level, or may be implemented at a device level by including other peripheral components. For example, the spectrum coordination device 300 may further include a communication unit (which is optional and is shown in a dashed box), for performing data transmission and reception operations with an external device. For example, the communication unit may be configured to perform communication with secondary systems managed by the spectrum coordination device 300, communication with the spectrum management device, communication with other spectrum coordination devices, and the like. In addition, it should be further noted that the specific implementation of the communication unit is not limited here, and it may include one or more communication interface(s) for realizing communication with different peripheral devices.

2-3. Electronic Device in a Secondary System According to an Embodiment of the Present Disclosure FIG. 4 is a block diagram showing an example of a functional configuration of an electronic device in a secondary system according to an embodiment of the present disclosure.

Figure 4:
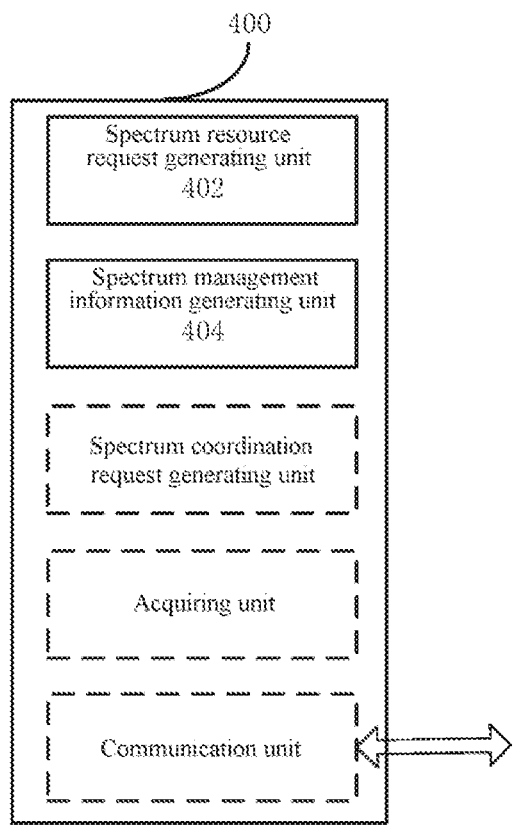
FIG. 4 is a block diagram showing an example of a functional configuration of an electronic device in a secondary system according to an embodiment of the present disclosure.

As shown in FIG. 4, an electronic device 400 according to the embodiment may include a spectrum resource request generating unit 402 and a spectrum management information generating unit 404. An example of a configuration of each functional unit is described in detail below.

The spectrum resource request generating unit 402 may be configured to generate a spectrum resource request.

Specifically, as described above, before using the spectrum resource of the primary system within a region in which each secondary system locates, each secondary system needs to send a spectrum resource request to the spectrum management device within the region, to request the spectrum management device to allocate an available spectrum resource thereto. The spectrum resource request may include state information of the secondary system, such as location information, a spectrum emission mask, a transmission bandwidth, a carrier frequency, and the like.

The spectrum management information generating unit 404 may be configured to generate spectrum management information indicating a condition of the secondary system in which the electronic device locates being managed by the spectrum coordination device. For example, as described above, the spectrum management information may include an ID of the spectrum coordination device that manages the secondary system. The spectrum management information is also to be sent to the spectrum management device, for the spectrum management device to determine whether the secondary system is managed by a specific spectrum coordination device.

Moreover, preferably, the electronic device 400 may further include a spectrum coordination request generating unit. The spectrum coordination request generating unit may be configured to generate a spectrum coordination request to be sent to a spectrum coordination device that manages the secondary system, so that the spectrum coordination device coordinates the spectrum use of the secondary system based on the spectrum coordination request. It should be appreciated that the spectrum coordination request generating unit is optional (which is shown in a dashed box in FIG. 4) and may be omitted when the secondary system in which the electronic device 400 locates is not managed by any of the spectrum coordination devices.

In addition, preferably, as described above, if there is no communication interface that may perform direct communication between the spectrum coordination device and the spectrum management device, the secondary system in which the electronic device 400 locates and which is managed by the spectrum coordination device also needs to relay the system information of the interfering secondary system determined by the spectrum management device. Specifically, the electronic device 400 may further include an acquiring unit that is configured to acquire system information of the interfering secondary system which is not managed by the spectrum coordination device and interference from which on the secondary system in which the electronic device 400 locates exceeds a predetermined threshold. The system information of the interfering secondary system is also to be sent to the spectrum coordinating device, for the spectrum coordinating device to coordinate the spectrum use of the secondary system based on the system information in conjunction with the spectrum coordination request. It should be appreciated that the acquiring unit is also optional (which is shown in a dashed box in FIG. 4), and may be omitted when there is a communication interface that may perform direct communication between the spectrum coordination device and the spectrum management device.

It should be noted that, the embodiment of the electronic device 400 described here corresponds to the above embodiments of the spectrum management device and the spectrum coordination device, and therefore, for the content that is not described in detail here, one may refer to the description of the corresponding part above, and details are not described herein again.

It should be noted that the electronic device 400 herein may be implemented at a chip level, or may be implemented at a device level by including other peripheral components. For example, the electronic device 400 may operate as a secondary system, and may further include a communication unit (which is optional and is shown in a dashed box) for performing data transmission and reception operations with an external device. For example, the communication unit may be used to perform communication with the spectrum management device, communication with the spectrum coordination device, communication with other secondary systems, and the like. In addition, it should be further noted that the specific implementation of the communication unit is not limited here, and it may include one or more communication interface(s) for realizing communication with different peripheral devices.

2-4. Wireless Communication System According to an Embodiment of the Present Disclosure FIG. 5 is a block diagram showing an example of a configuration of a wireless communication system according to an embodiment of the present disclosure.

Figure 5:
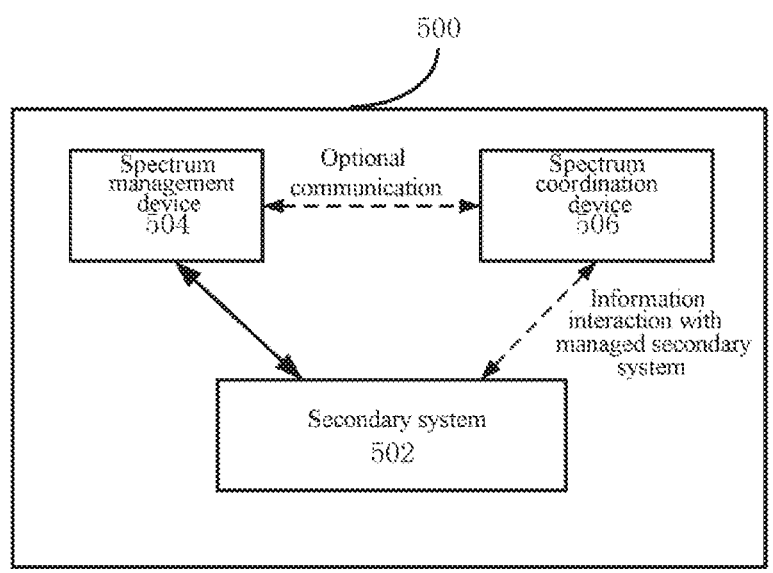
FIG. 5 is a block diagram showing an example of a configuration of a wireless communication system according to an embodiment of the present disclosure.

As shown in FIG. 5, a wireless communication system 500 according to the embodiment may include one or more secondary systems 502, a spectrum management device 504, and a spectrum coordination device 506.

Each of the one or more secondary systems 502 may be configured as described above with respect to FIG. 4, the spectrum management device 504 may be configured as described above with respect to FIG. 2, and the spectrum coordination device 506 may be configured as described above with reference to FIG. 3. For a specific configuration example, reference may be made to the description of the corresponding part above, and details are not described herein again.

It should be noted that in the wireless communication system 500, each of the number of the spectrum management device 504 and the number of the spectrum coordination device 506 may be one or more. For example, as shown in FIG. 1, there are two first level spectrum management devices (corresponding to the spectrum management devices 504), and some of secondary systems managed by the second level spectrum management device (corresponding to the spectrum coordination device 506) and secondary systems not managed by the second level spectrum management device (that is, including the managed secondary system and the unmanaged secondary system) request for available spectrum resources from the first level spectrum management device 1, and the other of the secondary systems (including the managed system and the unmanaged secondary system) request for available spectrum resources from the first level spectrum management device 2, so that the second level spectrum management device needs to obtain the available spectrum information and the information related to interference determined by the two first level spectrum management devices, respectively, to coordinate the spectrum use.

In addition, if the actual application allows, information interaction may also be performed among the multiple spectrum management devices and multiple spectrum coordination devices, to achieve optimal use of the spectrum resources. For example, when a result of coordinating the spectrum use of the managed secondary system by the spectrum coordination device based on the acquired current interference information cannot satisfy a predetermined performance requirement, the spectrum coordination device may send a request to the spectrum management device, such that the spectrum management device instructs one or more of the interfering secondary systems that are not managed originally by the spectrum management device (for example, several interfering secondary systems with strong interference, interfering secondary systems that may be managed by other spectrum coordination devices, or the like) to be subjected to management of the spectrum coordination device, to further coordinate the use of the spectrum resources, thus satisfying the performance requirement.

It should be noted that the various functional units described above with reference to FIGS. 2 to 5 are merely logical modules divided according to the specific functions thereof, and are not intended to limit the specific implementations. In the actual implementation, the above functional units and modules may be implemented as separated physical entities, or may be implemented as a single entity (for example, a processor (a CPU, a DSP or the like), an integrated circuit or the like).

In addition, it should be noted that although the device embodiments of the present disclosure have been described above with reference to block diagrams shown in FIGS. 2 to 5, these are exemplary rather than restrictive. Those skilled in the art may modify the shown examples of the functional configurations according to the principle of the present disclosure. For example, various functional modules in the embodiments may be added, deleted, modified, combined or the like, and all of such modifications are considered to fall within the scope of the present disclosure.

To further facilitate an understanding of the principle of the present disclosure, signaling interaction processes for implementing the technology of the present disclosure are described below with reference to the flowcharts shown in FIGS. 6A and 6B.

3. Signaling Interaction Processes According to an Embodiment of the Present Disclosure FIG. 6A is a schematic flowchart showing an example of a signaling interaction process according to an embodiment of the present disclosure.

Figure 6A:
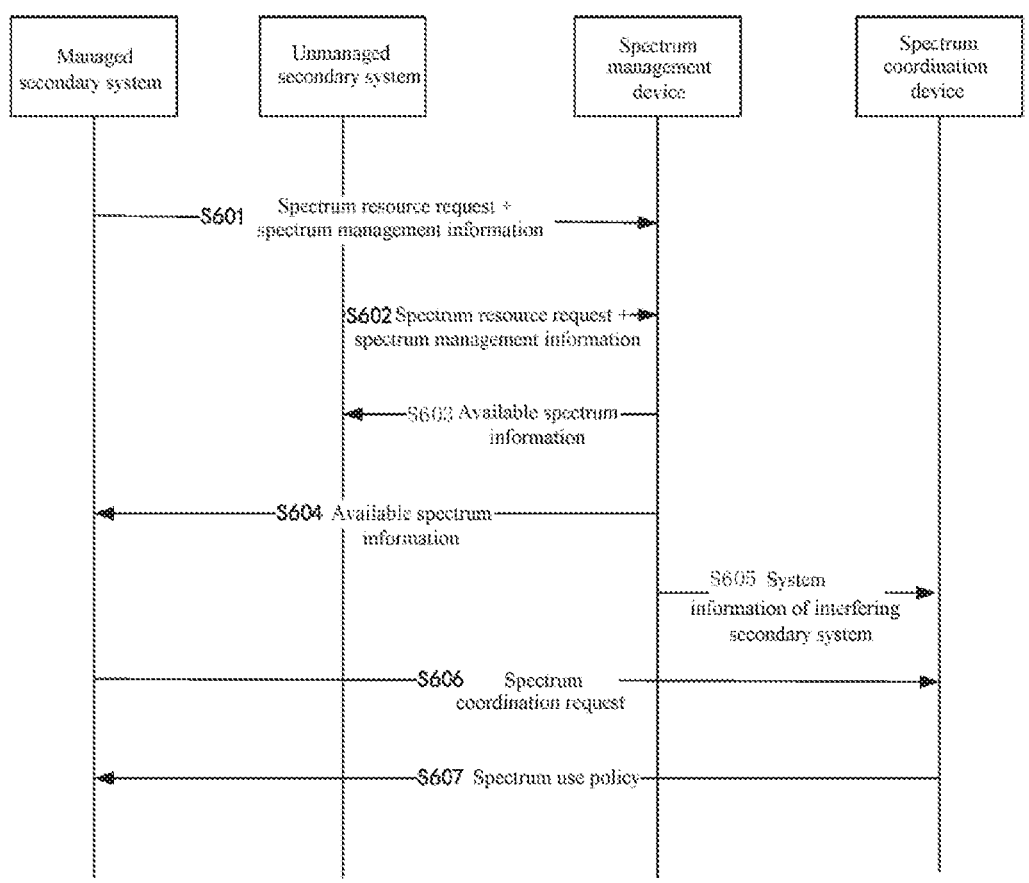
FIG. 6A is a schematic flowchart showing an example of a signaling interaction process according to an embodiment of the present disclosure.

As shown in FIG. 6A, in steps S601 and S602, each of the managed secondary system and the unmanaged secondary system sends a spectrum resource request and spectrum management information to the spectrum management device, which includes, for example, geographic location information, a spectrum emission mask, a transmission bandwidth, and a carrier spectrum of the secondary system, and ID information of the spectrum coordination device that manages the secondary system, and the like.

Here, it should be noted that although the spectrum resource request and the spectrum management information are sent in the same step in the example shown in FIG. 6A for simplification of the description, the spectrum resource request and the spectrum management information may be sent in different steps actually. Alternatively, as described above, the spectrum management information may also be included in the spectrum resource request and sent along with the spectrum resource request. The manner in which the two types of information are sent is not limited in the present disclosure.

Then, in step S603 and step S604, the spectrum management device may determine available spectrum information for each secondary system according to the received spectrum resource request, and send the determined available spectrum information to each secondary system. In addition, in step S605, the spectrum management device may determine the managed secondary system and the unmanaged secondary system according to the spectrum management information, and further determine an unmanaged, interfering secondary system that causes interference to the managed secondary system, thereby acquiring system information of the interfering secondary system and sending the system information to the spectrum coordination device.

Next, in step S606, the managed secondary system may send a spectrum coordination request to the spectrum coordination device. The coordination request may include information such as available spectrum information, a communication quality requirement, a coordination goal, and the like of the managed secondary system.

Then, in step S607, the spectrum coordination device may coordinate, in response to the received spectrum coordination request, the spectrum use of the managed secondary system when considering the received system information of the interfering secondary system and within a range of available spectrum resources determined by the spectrum management device, and send the coordination result as a spectrum use policy to the managed secondary system.

Figure 6B:
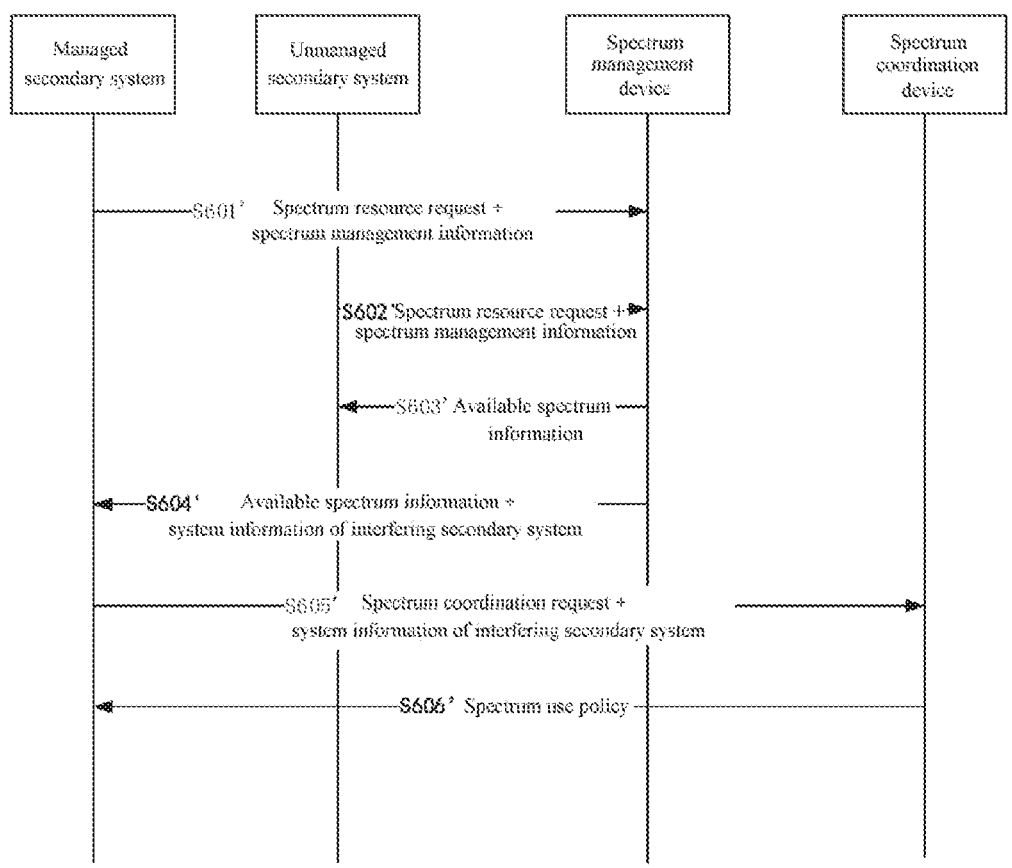
FIG. 6B is a schematic flowchart showing another example of a signaling interaction process according to another embodiment of the present disclosure.

FIG. 6B is a schematic flowchart of another example of a signaling interaction process according to another embodiment of the present disclosure.

The signaling interaction process shown in FIG. 6B is basically the same as the signaling interaction process shown in FIG. 6A, except that this example does not support direct communication between the spectrum management device and the spectrum coordination device, and thus the above system information of the interfering secondary system is required to be relayed by the managed secondary system. Specifically, as shown in FIG. 6B, in step S604', the spectrum management device sends not only the available spectrum information of the managed secondary system, but also the system information of the interfering secondary system that interferes with the managed secondary system to the managed secondary system. Furthermore, step S605 shown in FIG. 6A is omitted, and in step S605', the managed secondary system sends the received system information of the interfering secondary system together with the spectrum coordination request to the spectrum coordination device, for the spectrum coordination device to coordinate the spectrum use.

It should be noted that the signaling interaction processes shown in FIG. 6A and FIG. 6B are only examples for explaining the principle of the present disclosure, and those skilled in the art may appropriately modify the processes according to the principle of the present disclosure, and all such modifications are considered to fall within the scope of the present disclosure. For example, before the spectrum management device sends the system information of the interfering secondary system to the spectrum coordination device and the managed secondary system respectively in step S605 and step S604', the method may further include a step in which the spectrum coordination device and the managed secondary system each send a request for acquiring information related to interference to the spectrum management device, such that the spectrum management device sends the information related to interference in response to the request. For another example, although in steps S604' and S605' of FIG. 6B, a case that two types of information are sent in the same step is shown, in practice, the two types of information may also be separately sent in different steps. For yet another example, the above signaling interaction process may further include a step in which the spectrum coordination device requests the spectrum management device to instruct one or more of the interfering secondary systems to be subjected to management of the spectrum coordination device, a step in which the spectrum management device instructs the relevant interfering secondary system to be subjected to management of the spectrum coordination device, and a step in which the instructed relevant interfering secondary system sends the spectrum coordination request to the spectrum coordination device, and the like.

In addition, it should be noted that although the steps are numbered in time sequence for convenience of description in FIGS. 6A and 6B, these numbers do not indicate the order in which the steps are performed. In fact, these steps may be performed in parallel, or in a different order, and the like.

Corresponding to the above device embodiments, method embodiments according to the present disclosure are described below with reference to FIG. 7 to FIG. 9.

4. Method Embodiments According to the Present Disclosure

4-1. Spectrum Management Method According to the Present Disclosure

Figure 7:
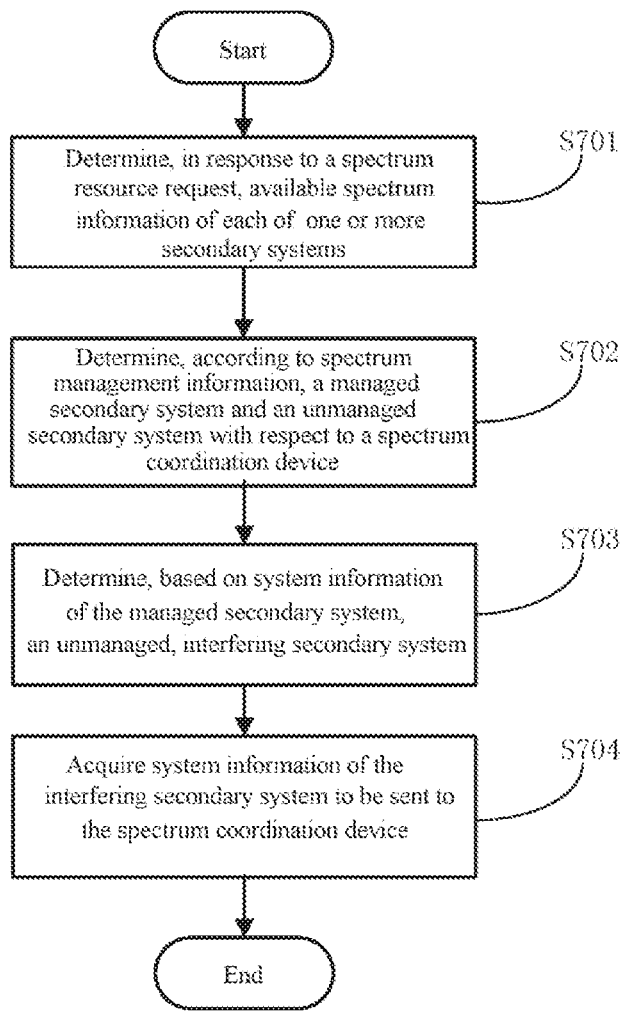
FIG. 7 is a flowchart showing an example of a process of a spectrum management method according to an embodiment of the present disclosure.

FIG. 7 is a flowchart showing a process example of a spectrum management method according to an embodiment of the present disclosure.

As shown in FIG. 7, the method starts at step S701. In step S701, in response to a spectrum resource request from each of one or more secondary systems, available spectrum information of each of the one or more secondary systems is determined. The process of determining the available spectrum resource of each secondary system according to the spectrum resource request of the secondary system is the same as that in the conventional technology, and is not described in detail herein.

Then, the method proceeds to step S702. In step 702, a managed secondary system which is managed by a spectrum coordination device and an unmanaged secondary system which is not managed by the spectrum coordination device among the one or more secondary systems are determined according to spectrum management information from each of the one or more secondary systems. Specifically, for example, it may be determined whether each of the secondary systems is managed by a certain spectrum coordination device according to an ID of the spectrum coordination device that manages each of the secondary systems which is included in the spectrum management information.

Next, the method proceeds to step S703. In step S703, based on the system information of the managed secondary system, the secondary system interference from which on the managed secondary system exceeds a predetermined threshold is determined, among the unmanaged secondary systems, as an interfering secondary system. The system information of the managed secondary system may include geographic location information, receiver information, application range information, and the like.

Then, the method proceeds to step S704. In step S704, system information of the interfering secondary system is acquired. The system information of the interfering secondary system is to be sent to the spectrum coordination device, for the spectrum coordination device to coordinate spectrum use of the managed secondary system of the spectrum coordination device based on the available spectrum information. The system information of the interfering secondary system may include one or more of geographic location information, available spectrum information, spectrum use information, system statistical information of a region in which the interfering secondary system locates, a transmission model, and a transmission antenna parameter and the like, so that the spectrum coordination device may coordinate the spectrum use in an appropriate manner according to the specific content of the received information.

It should be noted that the method embodiment described herein corresponds to the embodiment of the spectrum management device described above with reference to FIG. 2, and therefore, for the content that is not described in detail herein, one may refer to the description of the corresponding part above, and details are not described herein again.

4-2. Spectrum Coordination Method According to the Present Disclosure

Figure 8:
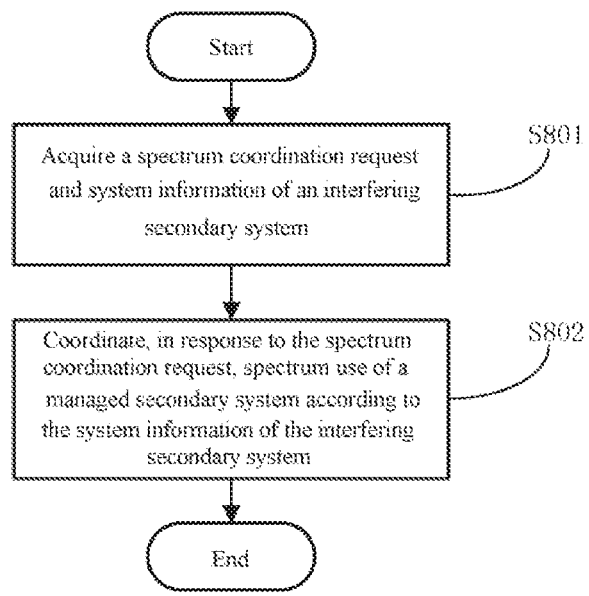
FIG. 8 is a flowchart showing an example of a process of a spectrum coordination method according to an embodiment of the present disclosure.

FIG. 8 is a flowchart showing a process example of a spectrum coordination method according to an embodiment of the present disclosure.

As shown in FIG. 8, the method starts at step S801. In step S801, a spectrum coordination request from a managed secondary system which is managed by a spectrum coordination device among one or more secondary systems, and system information of an interfering secondary system among the one or more secondary systems are acquired.

Preferably, the spectrum coordination request may include available spectrum information of the managed secondary system, and the available spectrum information may be determined by a spectrum management device according to the spectrum resource request from each of the one or more secondary systems. The interfering secondary system is a secondary system, interference from which on the managed secondary system exceeds a predetermined threshold, among unmanaged secondary systems which are not managed by the spectrum coordination device, and the interfering secondary system may be determined by the spectrum management device based on information related to the managed secondary system. The unmanaged secondary systems may be determined by the spectrum management device according to the spectrum management information from each of the one or more secondary systems.

Next, the method proceeds to step S802. In step S802, spectrum use of the managed secondary system is coordinated according to the acquired spectrum coordination request and the system information of the interfering secondary system.

Preferably, the spectrum use of the managed secondary system may be coordinated according to the information on interference direction that is included in the system information of the interfering secondary system, in combination with the spectrum coordination request (which includes available spectrum information, a communication quality request, a coordination goal and the like), in a manner of avoiding interference from being received by the managed secondary system. In addition, preferably, the interference condition within the region in which the interfering secondary system locates may be modeled according to the system statistical information included in the system information of the interference secondary system, and a transmission power of the managed secondary system is adjusted according to the modeled interference condition.

It should be noted that the method embodiment described herein corresponds to the embodiment of the spectrum coordination device described above with reference to FIG. 3, and therefore, for the content that is not described in detail herein, one may refer to the description of the corresponding part above, and details are not described herein again.

4-3. Method in an Electronic Device According to the Present Disclosure

Figure 9:
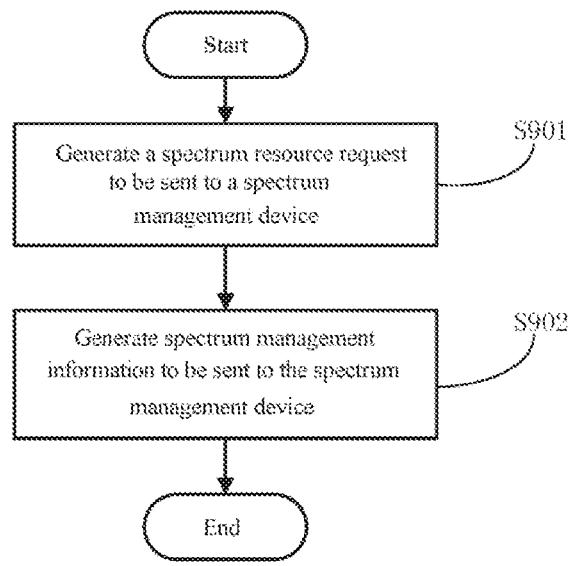
FIG. 9 is a flowchart showing an example of a process of a method in an electronic device according to an embodiment of the present disclosure.

FIG. 9 is a flowchart showing a process example of a method in an electronic device according to an embodiment of the present disclosure.

As shown in FIG. 9, the method starts at step S901. In step S901, a spectrum resource request is generated. The spectrum resource request may include geographic location information, a spectrum emission mask, a transmission bandwidth, a carrier frequency, and the like of the secondary system in which the electronic device locates.

Then, the method proceeds to step S902. In step S902, spectrum management information is generated indicating a condition of the secondary system in which the electronic device locates being managed by the spectrum coordination device. For example, as described above, the spectrum management information may include an ID of the spectrum coordination device that manages the secondary system.

The generated spectrum resource request and spectrum management information are both to be sent to the spectrum management device, for the spectrum management device to determine the available spectrum information of the secondary system and the spectrum coordination device that manages the secondary system.

Preferably, the method may further include generating a spectrum coordination request to be sent to a spectrum coordination device that manages the secondary system, so that the spectrum coordination device coordinates the spectrum use of the secondary system based on the spectrum coordination request.

Moreover, preferably, the method may further include relaying the system information of the interfering secondary system from the spectrum management device to the spectrum coordination device that manages the secondary system, wherein the interfering secondary system is a secondary system that causes great interference on the communication of the secondary system and is not managed by the spectrum coordination device.

It should be noted that the method embodiment described herein corresponds to the embodiment of the electronic device described above with reference to FIG. 4, and therefore, for the content that is not described in detail here, one may refer to the description of the corresponding part above, and details are not described herein again.

In addition, it should be understood that flow diagrams shown in above FIGS. 7 to 9 are exemplary rather than restrictive. A person skilled in the art may modify the described examples of the processing flows according to the principle of the present disclosure. For example, steps in various embodiments may be added, deleted, modified, combined or the like, and all of such modifications are considered to fall within the scope of the present disclosure.

It should be understood that the storage medium and the machine-executable instructions in a program product according to an embodiment of the present disclosure may be configured to perform a method corresponding to each of the above device embodiments, and therefore, for the content that is not described in detail here, one may refer to the description of the corresponding part above, and details are not described herein again.

Accordingly, a storage medium for carrying the above program product in which the machine-readable instructions are stored is also included in the technical solution of the present disclosure. The storage medium includes, but is not limited to, a floppy disk, an optical disk, a magneto-optical disk, a storage card, a memory rod and the like.

Figure 10:
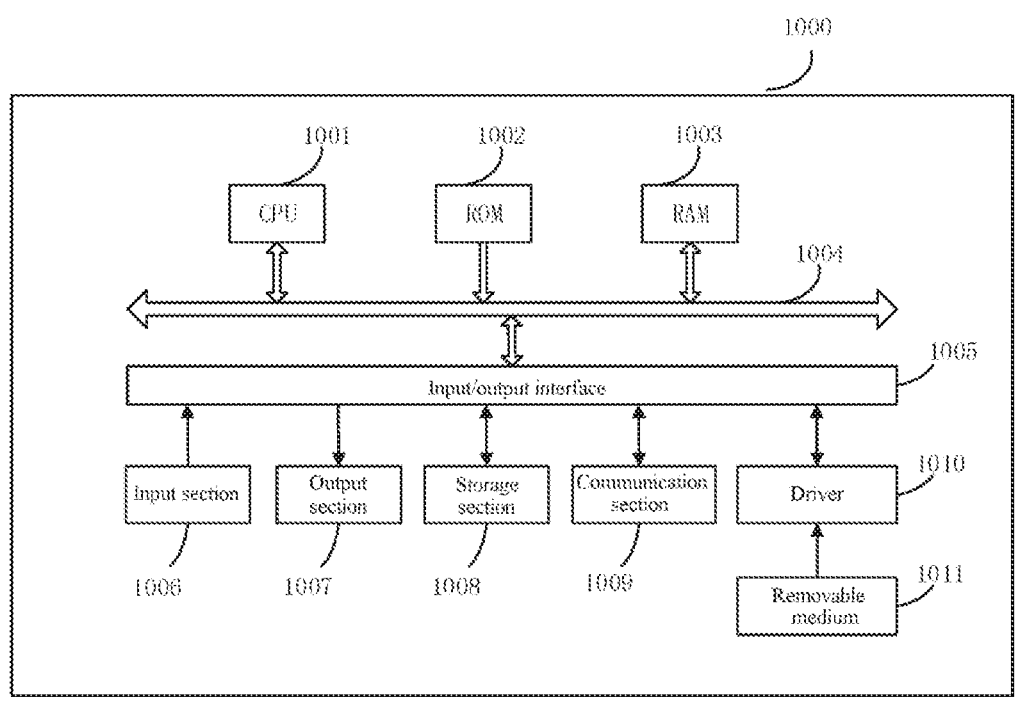
FIG. 10 is a block diagram showing an exemplary structure of a personal computer which may be used as an information processing device according to an embodiment of the present disclosure.

5. Computing Device for Implementing the Electronic Device and the Method According to the Present Disclosure In addition, it should further be noted that, the above series of processes and devices may also be implemented by software and/or firmware. In the case of being implemented in software and/or firmware, a program constituting the software is installed from a storage medium or a network to a computer with a dedicated hardware structure, for example, a general purpose personal computer 1000 shown in FIG. 10, which may perform various functions when various programs are installed thereon. FIG. 10 is a block diagram showing an exemplary structure of a personal computer used as an information processing device according to an embodiment of the present disclosure.

In FIG. 10, a central processing unit (CPU) 1001 executes various processes according to the program stored in a read only memory (ROM) 1002 or the program loaded from the storage section 1008 to a random access memory (RAM) 1003. In the RAM 1003, the data required by CPU 1001 to execute various processes is also stored as necessary.

The CPU 1001, the ROM 1002 and the RAM 1003 are linked with each other via a bus 1004. An input/output interface 1005 is also connected to the bus 1004.

The following components are linked to the input/output interface 1005: an input section 1006 (including a keyboard, a mouse and the like), an output section 1007 (including a display such as a cathode ray tube (CRT), a liquid crystal display (LCD), a loudspeaker and the like), a memory section 1008 (including a hard disc and the like), and a communication section 1009 (including a network interface card such as a LAN card, a modem and the like). The communication section 1009 performs a communication process via a network such as the Internet.

A driver 1010 may also be connected to the input/output interface 1005 as needed. A removable medium 1011, for example, a magnetic disk, an optical disk, a magnetic-optical disk, a semiconductor memory, and the like, may be installed on the drive 1010 as needed so that a computer program read therefrom may be installed into the storage section 1008 as needed.

In the case that the above series of processes are performed in software, a program constituting the software is installed from a network, for example, the Internet, or a storage medium, for example, the removable medium 1011.

It should be understood by those skilled in the art that the storage medium is not limited to the removable medium 1011 shown in FIG. 10 in which the program is stored and which is distributed separately from the device so as to provide the program to the user. Examples of the removable medium 1011 include a magnetic disk (including a Floppy Disk (a registered trademark)), an optical disk (including Compact Disk-Read Only memory (CD-ROM) and a Digital Versatile Disk (DVD)), a magnetic-optical disk (including a Mini Disk (MD) (a registered trademark)) and a semiconductor memory. Alternatively, the storage medium may be a ROM 1002, a hard disk included in the storage section 1008, and the like, which has a program stored therein and is distributed to the user along with a device in which they are incorporated.

6. Application Examples of the Technology According to the Present Disclosure

6-1. Application Examples of the Spectrum Management Device and the Spectrum Coordination Device The above spectrum management device may be applied, for example, to a spectrum access system (SAS) defined in a document "Spectrum Sharing Committee Work Group 3 (Protocols) SAS-CBSD TS WINNF-16-S-0016-V1.0.0 (hereinafter referred to as Reference 1)", which is a standard currently developed by the Wireless Innovation Forum (WINNF) organization, and the above spectrum coordination device may be applied, for example, to perform the coordination function of the Interference Coordination Group in Reference 1, which is standard currently developed by the citizen broadband radio service (CBRS) alliance.

It should be noted that the application of the spectrum management device and the spectrum coordination device described herein is merely an example rather than a limitation, and the spectrum management device and the spectrum coordination device according to the technology of the present disclosure may be applied to any device having the similar spectrum allocation function and interference coordination function.

6-2. Application Examples for the Secondary System

The secondary system including the above electronic device may be applied, for example, to a secondary system in the interference coordination group in the above Reference 1, that is, the Citizens Broadband Radio Service Device (CBSD).

The secondary system may include a base station (that is, a secondary base station) and a user equipment (that is, a secondary user). Specifically, the base station may be realized as any type of evolved Node B (eNB) such as a macro eNB and a small eNB. The small eNB may be an eNB such as a pico eNB, a micro eNB and a home (femto) eNB that covers a cell smaller than a macro cell. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH) disposed in a different place from the main body. In addition, various types of terminals, which will be described below, may each operate as the base station by temporarily or semi-persistently executing a base station function.

The user equipment may be realized as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be realized as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

6-2-1. Application Examples of a Base Station

First Application Example

Figure 11:
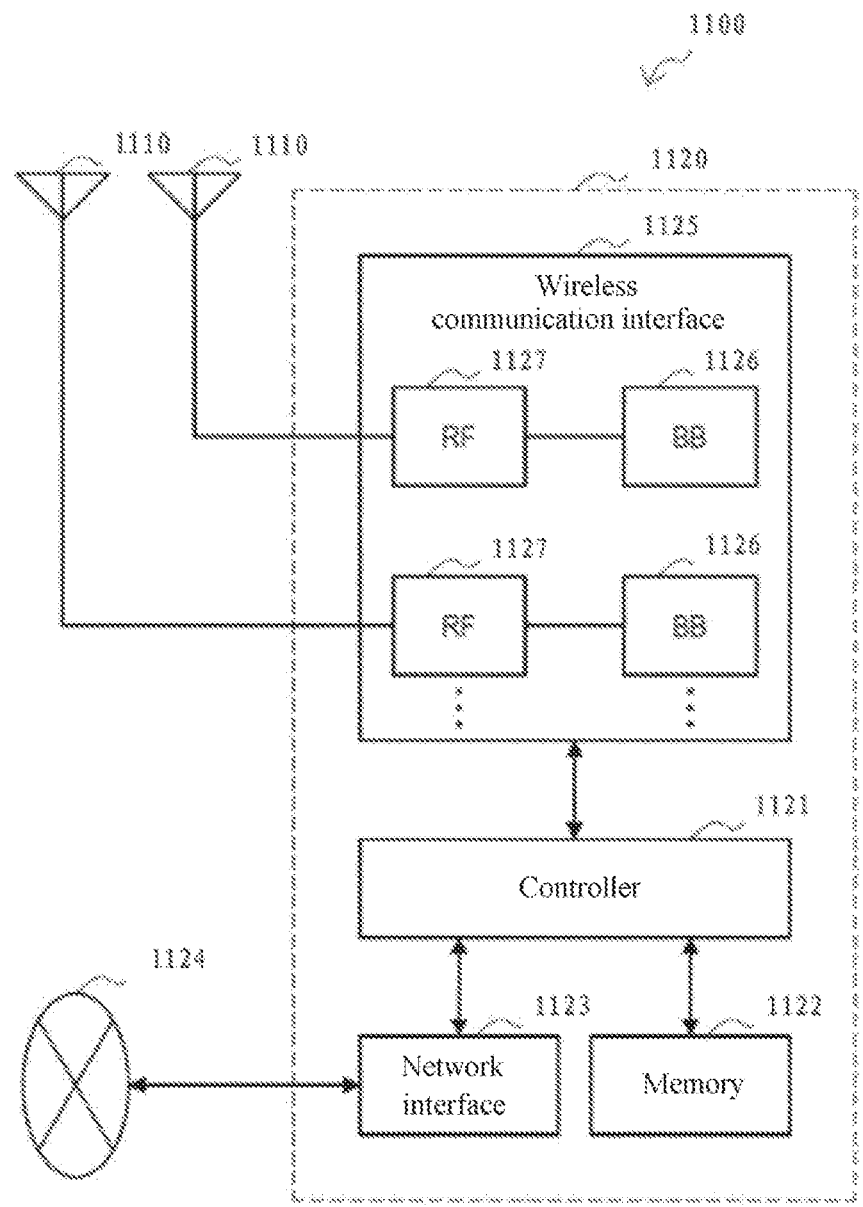
FIG. 11 is a block diagram showing a first example of a schematic configuration of an evolved node (eNB) to which the technology of the present disclosure may be applied.

FIG. 11 is a block diagram showing a first example of a schematic configuration of an eNB in which the technique of the disclosure may be applied. The eNB 1100 includes one or more antennas 1110 and a base station device 1120. The base station device 1120 and each of the antennas 1110 may be connected via a RF cable.

Each of the antennas 1110 includes a single or multiple antenna elements (such as multiple antenna elements included in a multiple-input multiple-output (MIMO) antenna), and are used for transmitting and receiving a wireless signal by the base station device 1120. The eNB 1100 may include the multiple antennas 1110, as shown in FIG. 11. For example, multiple antennas 1110 may be compatible with multiple frequency bands used by the eNB 1100. Although FIG. 11 shows an example in which the eNB 1100 includes multiple antennas 1110, the eNB 1100 may also include a single antenna 1110.

The base station device 1120 includes a controller 1121, a memory 1122, a network interface 1123, and a wireless communication interface 1125.

The controller 1121 may be, for example, a CPU or a DSP, and operates various functions of a higher layer of the base station device 1120. For example, the controller 1121 generates a data packet based on data in a signal processed by the wireless communication interface 1125, and transfers the generated packet via the network interface 1123. The controller 1121 may bundle data from multiple baseband processors to generate bundled packet, and transfer the generated bundled packet. The controller 1121 may have logical functions of performing control such as radio resource control, radio bearer control, mobility management, admission control, and scheduling. The control may be performed in conjunction with an adjacent eNB or a core network node. The memory 1122 includes RAM and ROM, and stores a program that is executed by the controller 1121, and various types of control data (such as a terminal list, transmission power data, and scheduling data).

The network interface 1123 is a communication interface for connecting the base station device 1120 to a core network 1124. The controller 1121 may communicate with a core network node or another eNB via the network interface 1123. In that case, the eNB 1100, and the core network node or the other eNB may be connected to each other through a logical interface (such as an S1 interface and an X2 interface). The network interface 1123 may be a wired communication interface or a wireless communication interface for a wireless backhaul line. If the network interface 1123 is a wireless communication interface, the network interface 1123 may use a higher frequency band for wireless communication than a frequency band used by the wireless communication interface 1125.

The wireless communication interface 1125 supports any cellular communication scheme (such as Long Term Evolution (LTE) and LTE-Advanced), and provides wireless connection to a terminal positioned in a cell of the eNB 1100 via the antenna 1110. The wireless communication interface 1125 may typically include, for example, a baseband (BB) processor 1126 and an RF circuit 1127. The BB processor 1126 may perform, for example, coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 1121, the BB processor 1126 may have a part or all of the above-described logical functions. The BB processor 1126 may be a memory storing communication control programs, or a module including a processor and a related circuit which are configured to execute programs. Updating the program may allow the functions of the BB processor 1126 to be changed. The module may be a card or a blade that is inserted into a slot of the base station device 1120. Alternatively, the module may be a chip that is mounted on the card or the blade. In addition, the RF circuit 1127 may include, for example, a frequency mixer, a filter or an amplifier, and transmits and receives wireless signals via the antenna 1110.

As shown in FIG. 11, the wireless communication interface 1125 may include multiple BB processors 1126. For example, multiple BB processors 1126 may be compatible with multiple frequency bands used by the eNB 1100. As shown in FIG. 11, the wireless communication interface 1125 may include multiple RF circuits 1127. For example, the multiple RF circuits 1127 may be compatible with multiple antenna elements. Although an example in which the wireless communication interface 1125 includes multiple BB processors 1126 and multiple RF circuits 1127 is shown in FIG. 11, the wireless communication interface 1125 may include a single BB processor 1126 and a single RF circuit 1127.

Second Application Example

Figure 12:
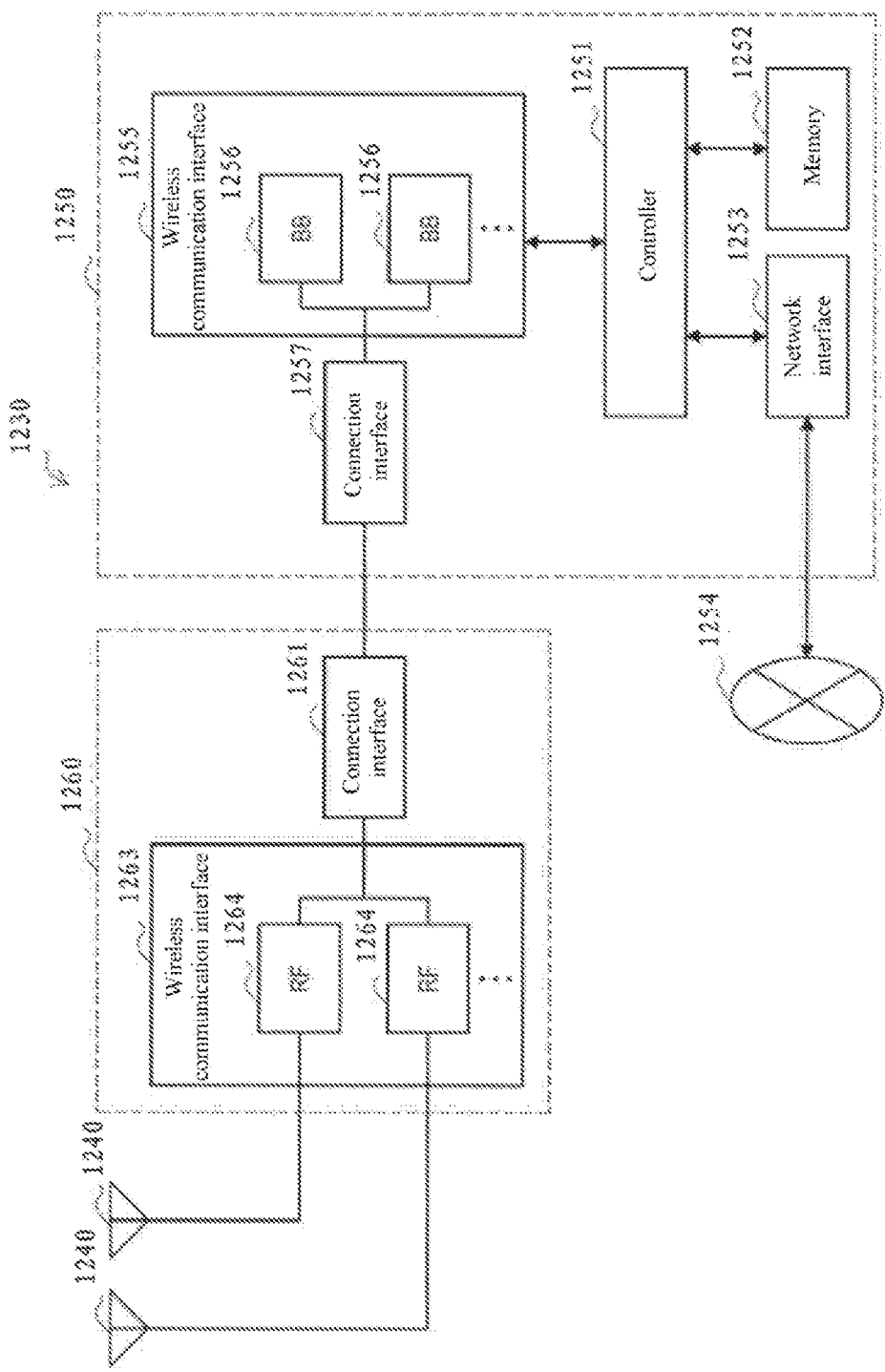
FIG. 12 is a block diagram showing a second example of a schematic configuration of the eNB to which the technology of the present disclosure may be applied.

FIG. 12 is a block diagram showing a second example of a schematic configuration of an eNB to which the technology according to the present disclosure may be applied. An eNB 1230 includes one or more antennas 1240, a base station device 1250 and an RRH 1260. Each antenna 1240 and the RRH 1260 may be connected to each other via an RF cable. The base station device 1250 and the RRH 1260 may be connected to each other via a high-speed line such as a fiber cable.

Each of the antennas 1240 includes a single or multiple antennal elements (such as multiple antenna elements included in a multiple-input multiple-output (MIMO) antenna), and is used for the RRH 1260 to transmit and receive wireless signals. As shown in FIG. 12, the eNB 1230 may include multiple antennas 1240. For example, the multiple antennas 1240 may be compatible with multiple frequency bands used by the eNB 1230. Although the eNB 1230 including multiple antennas 1240 is shown in FIG. 12, the eNB 1230 may also include a single antenna 1240.

The base station device 1250 includes a controller 1251, a memory 1252, a network interface 1253, a wireless communication interface 1255, and a connection interface 1257. The controller 1251, the memory 1252, and the network interface 1253 are the same as the controller 1121, the memory 1122, and the network interface 1123 described with reference to FIG. 11.

The wireless communication interface 1255 supports any cellular communication solution (such as LTE and LTE-advanced), and provides wireless communication with a terminal located in a sector corresponding to the RRH 1260 via the RRH 1260 and the antenna 1240. The wireless communication interface 1255 may typically include, for example, a BB processor 1256. Other than connecting to an RF circuit 1264 of the RRH 1260 via the connection interface 1257, the BB processor 1256 is the same as the BB processor 1126 described with reference to FIG. 11. As show in FIG. 12, the wireless communication interface 1255 may include multiple BB processors 1256. For example, the multiple BB processors 1256 may be compatible with the multiple frequency bands used by the eNB 1230. Although FIG. 12 shows an example in which the wireless communication interface 1255 includes multiple BB processors 1256, the wireless communication interface 1255 may also include a single BB processor 1256.

The connection interface 1257 is an interface for connecting the base station device 1250 (the wireless communication interface 1255) to the RRH 1260. The connection interface 1257 may also be a communication module for communication in the above high-speed line for connecting the base station device 1250 (the wireless communication interface 1255) to the RRH 1260.

The RRH 1260 includes a connection interface 1261 and a wireless communication interface 1263.

The connection interface 1261 is an interface for connecting the RRH 1260 (the wireless communication interface 1263) to the base station device 1250. The connection interface 1261 may also be a communication module for the communication in the above high-speed line.

The wireless communication interface 1263 transmits and receives wireless signals via the antenna 1240. The wireless communication interface 1263 may typically include, for example, the RF circuit 1264. The RF circuit 1264 may include, for example, a frequency mixer, a filter and an amplifier, and transmits and receives wireless signals via the antenna 1240. The wireless communication interface 1263 may include multiple RF circuits 1264, as shown in FIG. 12. For example, the multiple RF circuits 1264 may support multiple antenna elements. Although FIG. 12 shows the example in which the wireless communication interface 1263 includes the multiple RF circuits 1264, the wireless communication interface 1263 may also include a single RF circuit 1264.

In the eNB 1100 shown in FIG. 11 and the eNB 1230 shown in FIG. 12, the communication unit in the above electronic device 400 may be implemented by the wireless communication interface 1125 and the wireless communication interface 1255 and/or the wireless communication interface 1263. At least part of the functions of the spectrum resource request generating unit 402, the spectrum management information generating unit 404, the spectrum coordination request generating unit and the acquiring unit in the electronic device 400 may also be realized by the controller 1121 and the controller 1251.

6-2-2. Application Examples of a User Equipment

First Application Example

Figure 13:
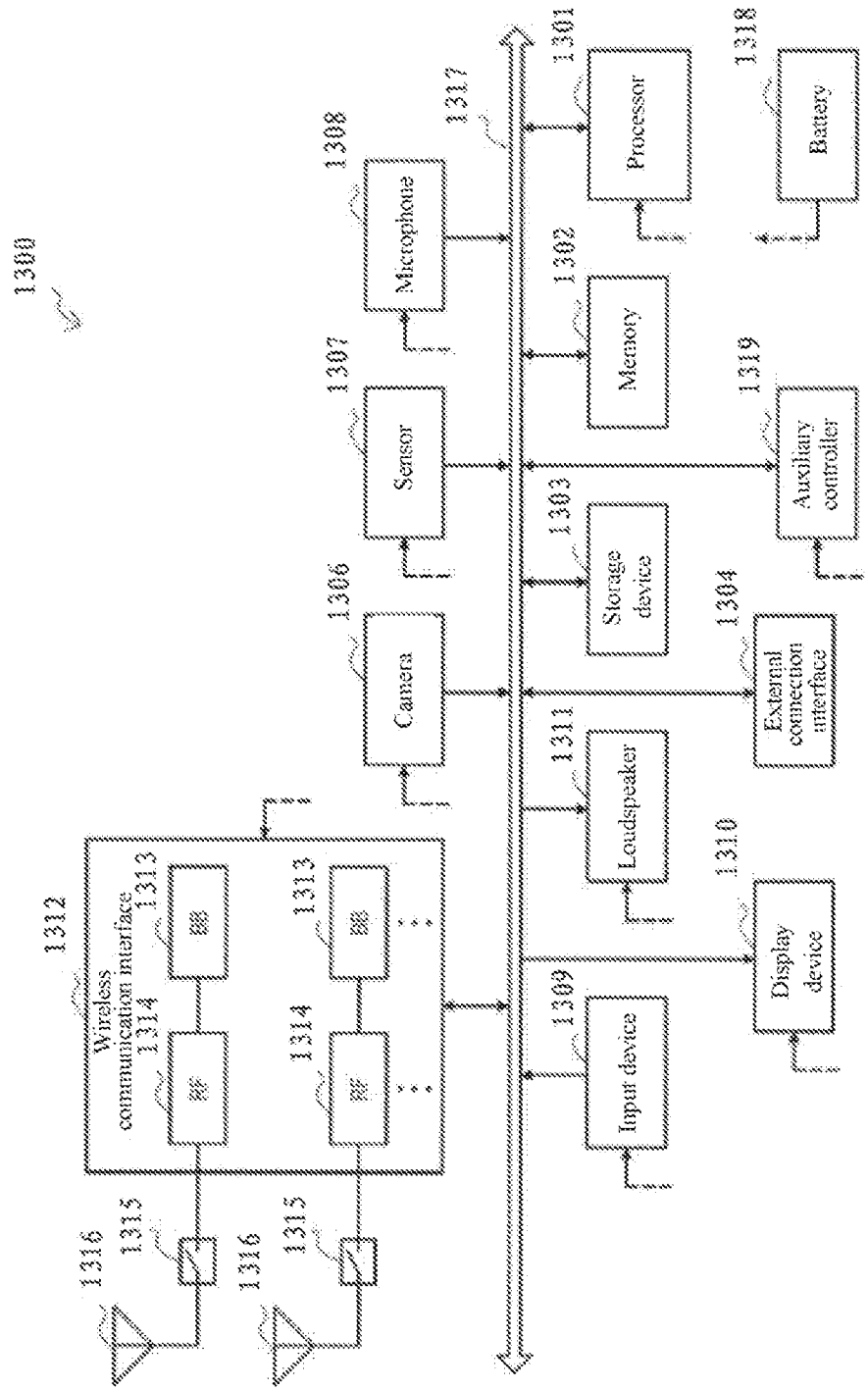
FIG. 13 is a block diagram showing an example of a schematic configuration of a smartphone to which the technology of the present disclosure may be applied.

FIG. 13 is a block diagram showing an example of a schematic configuration of a smartphone 1300 to which the technology of the present disclosure may be applied. The smartphone 1300 includes a processor 1301, a memory 1302, a storage device 1303, an external connection interface 1304, a camera 1306, a sensor 1307, a microphone 1308, an input device 1309, a display device 1310, a speaker 1311, a wireless communication interface 1312, one or more antenna switches 1315, one or more antennas 1316, a bus 1317, a battery 1318 and an auxiliary controller 1319.

The processor 1301 may be, for example, a CPU or a system on chip (SoC), and controls functions of an application layer and another layer of the smart phone 1300. The memory 1302 includes RAM and ROM, and stores a program that is executed by the processor 1301, and data. The storage device 1303 may include a storage medium such as a semiconductor memory and a hard disk. The external connection interface 1304 is an interface for connecting an external device (such as a memory card and a universal serial bus (USB) device) to the smart phone 1300.

The camera 1306 includes an image sensor (such as a charge coupled device (CCD) and a complementary metal oxide semiconductor (CMOS)), and generates a captured image. The sensor 1307 may include a group of sensors such as a measurement sensor, a gyro sensor, a geomagnetic sensor, and an acceleration sensor. The microphone 1308 converts sounds that are inputted to the smart phone 1300 into audio signals. The input device 1309 includes, for example, a touch sensor configured to detect touch onto a screen of the display device 1310, a keypad, a keyboard, a button, or a switch, and receive an operation or information inputted from a user. The display device 1310 includes a screen such as a liquid crystal display (LCD) and an organic light-emitting diode (OLED) display, and displays an output image of the smart phone 1300. The speaker 1311 converts audio signals that are outputted from the smartphone 1300 to sounds.

The wireless communication interface 1312 supports any cellular communication scheme (such as LET and LTE-Advanced), and performs wireless communication. The wireless communication interface 1212 may include, for example, a BB processor 1313 and an RF circuit 1314. The BB processor 1313 may perform for example coding/decoding, modulation/demodulation and multiplexing/de-multiplexing, and perform various types of signal processes for wireless communication. The RF circuit 1314 may include, for example, a frequency mixer, a filter and an amplifier, and transmits and receives wireless signals via the antenna 1316.

The wireless communication interface 1312 may be a chip module having the BB processor 1313 and the RF circuit 1314 integrated thereon. The wireless communication interface 1312 may include multiple BB processors 1313 and multiple RF circuits 1314, as shown in FIG. 13. Although FIG. 13 shows the example in which the wireless communication interface 1312 includes the multiple BB processors 1313 and the multiple RF circuits 1314, the wireless communication interface 1312 may also include a single BB processor 1313 or a single RF circuit 1314.

Moreover, in addition to a cellular communication scheme, the wireless communication interface 1312 may also support another type of wireless communication scheme such as a device to device (D2D) communication scheme, a short-distance wireless communication scheme, a near field communication scheme, and a wireless local area network (LAN) scheme. In this case, the wireless communication interface 1312 may include a BB processor 1313 and an RF circuit 1314 for each wireless communication scheme.

Each of the antenna switches 1315 switches a connection destination of the antenna 1316 between multiple circuits (such as circuits for different wireless communication schemes) included in the wireless communication interface 1312.

Each of the antennas 1316 includes a single or multiple antenna elements (such as multiple antenna elements included in the MIMO antenna), and is used for the wireless communication interface 1312 to transmit and receive wireless signals. The smartphone 1300 may include the multiple antennas 1316, as shown in FIG. 13. Although FIG. 13 shows the example in which the smartphone 1300 includes the multiple antennas 1316, the smartphone 1300 may also include a single antenna 1316.

Furthermore, the smart phone 1300 may include the antenna 1316 for each wireless communication scheme. In this case, the antenna switch 1315 may be omitted from the configuration of the smart phone 1300.

The bus 1317 connects the processor 1301, the memory 1302, the storage device 1303, the external connection interface 1304, the camera 1306, the sensor 1307, the microphone 1308, the input device 1309, the display device 1310, the speaker 1311, the wireless communication interface 1312, and the auxiliary controller 1319 to each other. The battery 1318 supplies power to blocks of the smart phone 1300 shown in FIG. 13 via feeder lines, which are partially shown as dashed lines in the figure. The auxiliary controller 1319 operates a minimum necessary function of the smart phone 1300, for example, in a sleep mode.

In the smartphone 1300 shown in FIG. 13, the communication unit in the electronic device 400 described above may be implemented by the wireless communication interface 1312. At least a part of the functions of the spectrum resource request generating unit 402, the spectrum management information generating unit 404, the spectrum coordination request generating unit and the acquiring unit in the electronic device 400 may also be implemented by the processor 1301 or the auxiliary controller 1319.

Second Application Example

Figure 14:
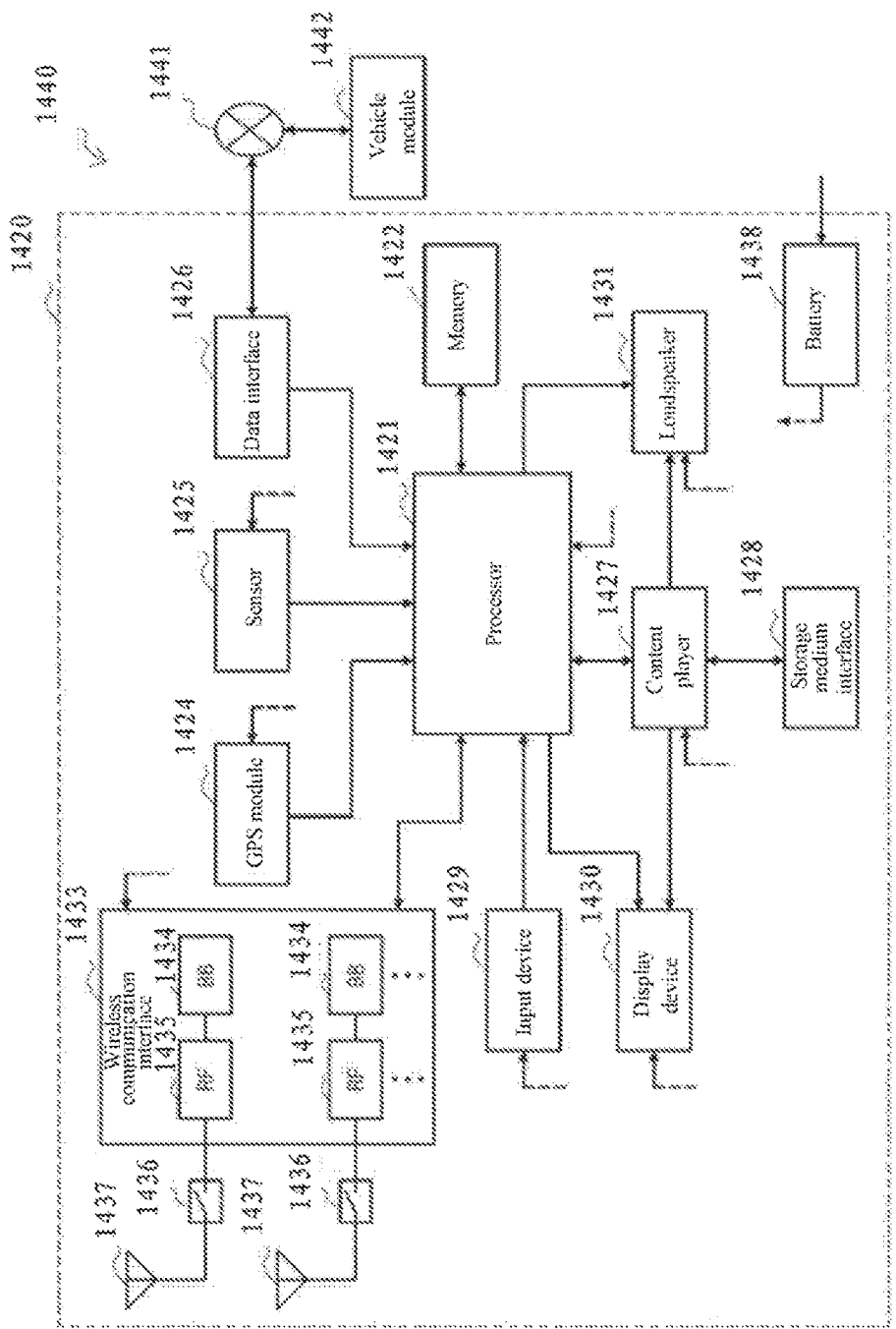
FIG. 14 is a block diagram of an example of a schematic configuration of a car navigation device to which the technology of the present disclosure may be applied.

FIG. 14 is a block diagram showing an example of a schematic configuration of a car navigation device 1420 to which the technology according to the present disclosure may be applied. The car navigation device 1420 includes a processor 1421, a memory 1422, a global positioning system (GPS) module 1424, a sensor 1425, a data interface 1426, a content player 1427, a storage medium interface 1428, an input device 1429, a display device 1430, a speaker 1431, a wireless communication interface 1433, one or more antenna switches 1436, one or more antennas 1437, and a battery 1438.

The processor 1421 may be, for example, the CPU or the SoC, and control the functions of the application layer and another layer of the car navigation device 1420. The memory 1422 includes RAM and ROM, and stores a program that is executed by the processor 1421, and data.

The GPS module 1424 measures a position (such as latitude, longitude and altitude) of the car navigation device 1420 using GPS signals received from a GPS satellite. The sensor 1425 may include a group of sensors such as a gyroscope sensor, a geomagnetic sensor and an air pressure sensor. The data interface 1426 is connected to, for example, an in-vehicle network 1441 via a terminal that is not shown, and acquires data generated by the vehicle (such as vehicle speed data).

The content player 1427 reproduces content stored in a storage medium (such as a CD and a DVD) that is inserted into the storage medium interface 1428. The input device 1429 includes, for example, a touch sensor configured to detect touch on a screen of the display device 1430, a button, or a switch, and receives an operation or information inputted from a user. The display device 1430 includes a screen such as a LCD or an OLED display, and displays an image of the navigation function or content that is reproduced. The speaker 1431 outputs sounds of the navigation function or the content that is reproduced.

The wireless communication interface 1433 supports any cellular communication scheme (such as LTE and LTE-advanced) and performs wireless communication. The wireless communication interface 1433 may typically include, for example, a BB processor 1434 and an RF circuit 1435. The BB processor 1434 may perform, for example, coding/decoding, modulation/demodulation and multiplexing/demultiplexing, and perform various types of signal processes for wireless communication. The RF circuit 1435 may include, for example, a frequency mixer, a filter and an amplifier, and transmits and receives wireless signals via the antenna 1437. The wireless communication interface 1433 may also be one chip module that has the BB processor 1434 and the RF circuit 1435 integrated thereon. The wireless communication interface 1433 may include multiple BB processors 1434 and multiple RF circuits 1435, as shown in FIG. 14. Although FIG. 14 shows the example in which the wireless communication interface 1433 includes the multiple BB processors 1434 and the multiple RF circuits 1435, the wireless communication interface 1433 may also include a single BB processor 1434 or a single RF circuit 1435.

In addition to the cellular communication scheme, the wireless communication interface 1433 may also support another type of wireless communication schemes such as a device-to-device (D2D) communication scheme, a short-distance wireless communication scheme, a near field communication scheme, and a wireless LAN scheme. In this case, the wireless communication interface 1433 may include a BB processor 1434 and a RF circuit 1435 for each wireless communication scheme.

Each of the antenna switches 1436 switches connection destinations of the antenna 1437 among multiple circuits (such as circuits for different wireless communication schemes) included in the wireless communication interface 1433.

Each of the antennas 1437 includes a single or multiple antenna elements (such as multiple antenna elements included in the MIMO antenna), and is used for the wireless communication interface 1433 to transmit and receive wireless signals. The car navigation device 1420 may include multiple antennas 1437, as shown in FIG. 14. Although FIG. 14 shows the example in which the car navigation device 1420 includes the multiple antennas 1437, the car navigation device 1420 may also include a single antenna 1437.

Furthermore, the car navigation device 1420 may include the antenna 1437 for each wireless communication scheme. In this case, the antenna switch 1436 may be omitted from the configuration of the vehicle navigation device 1420.

The battery 1438 supplies power to blocks of the car navigation device 1420 shown in FIG. 14 via feeder lines that are partially shown as dashed lines in the drawing. The battery 1438 accumulates power supplied form the vehicle.

In the car navigation device 1420 shown in FIG. 14, the communication unit in the electronic device 400 described above may be implemented by the wireless communication interface 1433. At least a part of the functions of the spectrum resource request generating unit 402, the spectrum management information generating unit 404, the spectrum coordination request generating unit and the acquiring unit in the electronic device 400 may also be implemented by the processor 1421.

The technology of the present disclosure may also be implemented as an in-vehicle system (or a vehicle) 1440 including one or more of the car navigation device 1420, a vehicle network 1441 and a vehicle module 1442. The vehicle module 1442 generates vehicle data (such as vehicle speed, engine speed, and trouble information), and outputs the generated data to the in-vehicle network 1441.

Preferred embodiments of the disclosure have been described above with reference to the drawings, but the disclosure is not limited to the above examples. Those skilled in the art may make various changes and modifications within the scope of the appended claims, and it should be understood that such changes and modifications naturally fall within the technical scope of the present disclosure.

For example, multiple functions of one unit in the above embodiment may be realized with separate devices. Alternatively, multiple functions implemented by multiple units in the above embodiments may be implemented by separated devices respectively. Furthermore, one of the above functions may be implemented by multiple units. Needless to say, such configuration is included in the technical scope of the present disclosure.

In the specification, steps described in the flowchart include not only the processes performed chronologically, but also the processes performed in parallel or individually rather than chronologically. Further, even in the steps processed chronically, without saying, the order may be appropriately changed.

Although the present disclosure and its advantages have been described in detail, it should be understood that, various changes, substitutions and alterations may be made herein without departing from the spirit and scope of the disclosure as defined by the appended claims. In addition, the term "include", "comprise" or any variant thereof in the embodiments of the present disclosure is intended to encompass nonexclusive inclusion, so that a process, a method, an article or a device including a series of elements includes not only those elements but also other elements which have been not listed definitely or element(s) inherent to the process, the method, the article or the device. Without limiting more, the elements defined by the statement "comprising one . . . " do not exclude that there are other identical elements in the process, method, article, or device that includes said elements.

The invention claimed is:

1. A spectrum management device comprising processing circuitry, the processing circuitry configured to:
   determine, in response to a spectrum resource request from each of a plurality of secondary systems, available spectrum information of each of the plurality of secondary systems;
   receive spectrum management information from each of the plurality of secondary systems, the spectrum management information including ID information of a spectrum coordination device related to each of the one or more secondary systems;
   determine, for each of the plurality of secondary systems, whether each is a managed secondary system managed by a first spectrum coordination device or is an unmanaged secondary system not managed by the first spectrum coordination device based on the received spectrum management information from each of the plurality of secondary systems;
   determine, based on system information of the managed secondary system, interference from a secondary system, which on the managed secondary system exceeds a predetermined threshold, among the unmanaged secondary systems as an interfering secondary system;
   acquire system information of the interfering secondary system; and
   transmit the system information of the interfering secondary system to the first spectrum coordination device to enable the spectrum coordination device to coordinate spectrum use of the managed secondary system based on the available spectrum information and the system information of the interfering secondary system.

2. The spectrum management device according to claim 1, wherein the spectrum management information comprises information related to a condition of being managed by the spectrum coordination device of the one or more secondary systems.

3. The spectrum management device according to claim 1, wherein the system information of the managed secondary system comprises geographical position information and receiver information of the managed secondary system, and the processing circuitry is further configured to determine a range of the managed secondary system according to the geographical position information and the receiver information of the managed secondary system, and determine the interfering secondary system according to information related to the range.

4. The spectrum management device according to claim 1, wherein the processing circuitry is further configured to acquire one or more of geographical position information, available spectrum information and spectrum use information of the interfering secondary system as the system information of the interfering secondary system, the available spectrum information comprising one or more of a transmission power and an antenna angle, and the spectrum use information comprising one or more of a system activation probability and movement information.

5. The spectrum management device according to claim 1, wherein the processing circuitry is further configured to acquire system statistical information within a region in which the interfering secondary system locates as the system information of the interfering secondary system, the system statistical information comprising one or more of the number of interfering secondary systems and movement information within the region.

6. The spectrum management device according to claim 1, wherein the processing circuitry is further configured to calculate, for each managed secondary system, aggregated interference from the interfering secondary system as the system information of the interfering secondary system, according to a transmission model of a region in which the interfering secondary system locates and a transmission antenna parameter of the interfering secondary system.

7. The spectrum management device according to claim 1, wherein the processing circuitry is further configured to instruct, in response to a request from the spectrum coordination device, one or more of the interfering secondary systems to be subjected to management of the spectrum coordination device.

8. The spectrum management device according to claim 1, wherein the processing circuitry is further configured to send the system information of the interfering secondary system to the spectrum coordination device.

9. The spectrum management device according to claim 1, wherein the system information of the interfering secondary system is sent from the spectrum management device to the spectrum coordination device via the managed secondary system.

10. A spectrum coordination device comprising processing circuitry, the processing circuitry configured to:
    coordinate, in response to a spectrum coordination request from a managed secondary system which is managed by the spectrum coordination device among a plurality of secondary systems, spectrum use of the managed secondary system according to system information of an interfering secondary system among plurality of secondary systems; and
    receive the system information of the interfering secondary system from a spectrum coordination device to enable the spectrum coordination device to coordinate spectrum use of the managed secondary system based on the available spectrum information and the system information of the interfering secondary system,
    wherein the interfering secondary system is a secondary system, interference from which on the managed secondary system exceeds a predetermined threshold, among an unmanaged secondary system which is not managed by the spectrum coordination device, the unmanaged secondary system is determined by the spectrum management device according to spectrum management information from each of the plurality of secondary systems, and the system information of the interfering secondary system is acquired by the spectrum management device, and
    wherein the spectrum management information includes ID information of a spectrum coordination device related to each of the plurality of secondary systems.

11. The spectrum coordination device according to claim 10, wherein the system information of the interfering secondary system comprises information on interference direction, and the processing circuitry is further configured to coordinate, according to the information on interference direction, spectrum use of the managed secondary system in a manner of avoiding interference from being received by the managed secondary system.

12. The spectrum coordination device according to claim 10, wherein the system information of the interfering secondary system comprises system statistical information within a region in which the interfering secondary system locates, and the processing circuitry is further configured to model an interference condition within the region according to the system statistical information and adjust a transmission power of the managed secondary system according to the modeled interference condition.

13. The spectrum coordination device according to claim 10, wherein the processing circuitry is further configured to request, in a case that a result of coordinating the spectrum use of the managed secondary system can not satisfy a predetermined performance requirement, the spectrum management device to instruct one or more of the interfering secondary systems to be subjected to management of the spectrum coordination device.

14. The spectrum coordination device according to claim 10, wherein the system information of the interfering secondary system is directly from the spectrum management device, or relayed via the managed secondary system.

* * * * *